US010115962B2

(12) United States Patent
Bowling et al.

(10) Patent No.: US 10,115,962 B2
(45) Date of Patent: Oct. 30, 2018

(54) HIGH CAPACITY CATHODE MATERIAL WITH STABILIZING NANOCOATINGS

(71) Applicant: Envia Systems, Inc., Newark, CA (US)

(72) Inventors: Charles A. Bowling, Palo Alto, CA (US); Subramanian Venkatachalam, Pleasanton, CA (US); Herman A. Lopez, Sunnyvale, CA (US); Sujeet Kumar, Newark, CA (US)

(73) Assignee: ENVIA SYSTEMS, INC., Newark, CA (US)

( * ) Notice: Subject to any disclaimer, the term of this patent is extended or adjusted under 35 U.S.C. 154(b) by 411 days.

(21) Appl. No.: 13/722,597

(22) Filed: Dec. 20, 2012

(65) Prior Publication Data

US 2014/0178760 A1 Jun. 26, 2014

(51) Int. Cl.
*H01M 4/131* (2010.01)
*H01M 4/1391* (2010.01)
*H01M 4/02* (2006.01)

(52) U.S. Cl.
CPC ......... *H01M 4/131* (2013.01); *H01M 4/1391* (2013.01); *H01M 2004/028* (2013.01)

(58) Field of Classification Search
None
See application file for complete search history.

(56) References Cited

U.S. PATENT DOCUMENTS 5,658,693 A 8/1997 Thackeray et al.
5,674,645 A 10/1997 Amatucci et al.
(Continued)

FOREIGN PATENT DOCUMENTS

EP 2264814 A1 12/2010
JP 57065674 A2 4/1982
(Continued)

OTHER PUBLICATIONS

Wang et al., Uniform AlF3 thin layer to improve rate capability of LiNi⅓Co⅓Mn⅓O2 material for Li-ion batteries, Trans. Nonferrous Met. Soc. China 20(2010) 803-808, 6 pages total.*
(Continued)

*Primary Examiner* — Ula C Ruddock
*Assistant Examiner* — Anna Korovina
(74) *Attorney, Agent, or Firm* — Christensen, Fonder, Dardi & Herbert PLLC; Peter S. Dardi

(57) ABSTRACT

A positive electrode active material comprising a lithium rich metal oxide active composition coated with aluminum zinc oxide coating composition is disclosed. The aluminum zinc oxide can be represented by the formula $Al_xZn_{1-3x/2}O$, where x is from about 0.01 to about 0.6. In some embodiments, the material can have an average voltage that is very stable with cycling, and a specific capacity of at least about 175 mAh/g and an average voltage of at least about 3.55V discharged at a rate of C/3 from 4.6V to 2V against lithium. The material can further comprise an overcoat of metal halide over the aluminum zinc oxide coating. In some embodiments, the material can have from about 1 mole percent to about 15 mole percent aluminum zinc oxide coating and from about 0.5 mole percent to about 3 mole percent aluminum halide overcoat.

23 Claims, 12 Drawing Sheets

(56) References Cited

U.S. PATENT DOCUMENTS

| | | |
|---|---|---|
| 6,037,095 A | 3/2000 | Miyasaka |
| 6,087,042 A | 7/2000 | Sugiyama et al. |
| 6,168,887 B1 | 1/2001 | Dahn et al. |
| 6,183,718 B1 | 2/2001 | Barker et al. |
| 6,248,477 B1 | 6/2001 | Howard, Jr. et al. |
| 6,251,822 B1 | 6/2001 | Peng et al. |
| 6,322,744 B1 | 11/2001 | Kelley et al. |
| 6,372,385 B1 | 4/2002 | Kweon et al. |
| 6,420,071 B1 | 7/2002 | Lee et al. |
| 6,428,766 B1 | 8/2002 | Fujino et al. |
| 6,489,060 B1 | 12/2002 | Zhang et al. |
| 6,589,499 B2 | 7/2003 | Gao et al. |
| 6,596,435 B2 | 7/2003 | Kelley et al. |
| 6,660,432 B2 | 12/2003 | Paulsen et al. |
| 6,677,082 B2 | 1/2004 | Thackeray et al. |
| 6,680,143 B2 | 1/2004 | Thackeray et al. |
| 6,749,648 B1 | 6/2004 | Kumar et al. |
| 6,872,491 B2 | 3/2005 | Kanai et al. |
| 6,964,828 B2 | 11/2005 | Lu et al. |
| 7,078,128 B2 | 7/2006 | Lu et al. |
| 7,135,252 B2 | 11/2006 | Thackeray et al. |
| 7,205,072 B2 | 4/2007 | Kang et al. |
| 7,285,357 B2 | 10/2007 | Jordy et al. |
| 7,364,793 B2 | 4/2008 | Paulsen et al. |
| 7,368,071 B2 | 5/2008 | Dahn et al. |
| 7,393,476 B2 | 7/2008 | Shiozaki et al. |
| 7,435,402 B2 | 10/2008 | Kang et al. |
| 7,452,631 B2 | 11/2008 | Kitao et al. |
| 7,468,223 B2 | 12/2008 | Thackeray et al. |
| 7,517,613 B2 | 4/2009 | Yuasa et al. |
| 7,674,557 B2 | 3/2010 | Sun et al. |
| 8,187,752 B2 | 5/2012 | Buckley et al. |
| 2002/0055042 A1 | 5/2002 | Kweon et al. |
| 2002/0110736 A1 | 8/2002 | Kweon et al. |
| 2002/0114995 A1 | 8/2002 | Thackeray et al. |
| 2003/0082448 A1 | 5/2003 | Cho et al. |
| 2003/0087155 A1 | 5/2003 | Cho et al. |
| 2003/0108790 A1 | 6/2003 | Manthiram et al. |
| 2004/0076884 A1 | 4/2004 | Lee et al. |
| 2004/0091779 A1 | 5/2004 | Kang et al. |
| 2004/0200998 A1 | 10/2004 | Park et al. |
| 2005/0031942 A1 | 2/2005 | Hennige et al. |
| 2005/0202316 A1 | 9/2005 | Hwang et al. |
| 2005/0220700 A1 | 10/2005 | Suhara et al. |
| 2006/0051671 A1 | 3/2006 | Thackeray et al. |
| 2006/0051673 A1 | 3/2006 | Johnson et al. |
| 2006/0083991 A1 | 4/2006 | Ahn et al. |
| 2006/0147809 A1 | 7/2006 | Amine et al. |
| 2006/0188781 A1 | 8/2006 | Thackeray et al. |
| 2006/0257743 A1 | 11/2006 | Kuratomi et al. |
| 2006/0275667 A1 | 12/2006 | Watanabe et al. |
| 2007/0072080 A1 | 3/2007 | Inagaki et al. |
| 2007/0111098 A1 | 5/2007 | Yang Kook et al. |
| 2007/0122703 A1 | 5/2007 | Whitfield et al. |
| 2007/0160906 A1 | 7/2007 | Tooyama et al. |
| 2007/0202405 A1 | 8/2007 | Shizuka et al. |
| 2007/0212607 A1 | 9/2007 | Fujihara et al. |
| 2007/0281212 A1 | 12/2007 | Thackeray et al. |
| 2007/0292757 A1 | 12/2007 | Watanabe et al. |
| 2008/0102369 A1 | 5/2008 | Sakata et al. |
| 2008/0107968 A1 | 5/2008 | Patoux et al. |
| 2008/0118847 A1 | 5/2008 | Jung et al. |
| 2008/0135802 A1 | 6/2008 | Saito et al. |
| 2008/0157027 A1 | 7/2008 | Manthiram et al. |
| 2008/0193841 A1 | 8/2008 | Sun et al. |
| 2008/0241693 A1 | 10/2008 | Fukuchi et al. |
| 2008/0268347 A1 | 10/2008 | Ohzuku et al. |
| 2009/0087362 A1 | 4/2009 | Sun et al. |
| 2009/0104532 A1 | 4/2009 | Hosoya |
| 2009/0127520 A1 | 5/2009 | Whitfield et al. |
| 2009/0155694 A1 | 6/2009 | Park |
| 2009/0253042 A1 | 10/2009 | Sun et al. |
| 2009/0263707 A1 | 10/2009 | Buckley et al. |
| 2009/0297947 A1 | 12/2009 | Deng et al. |
| 2009/0305131 A1 | 12/2009 | Kumar et al. |
| 2010/0086853 A1 | 4/2010 | Venkatachalam et al. |
| 2010/0086854 A1 | 4/2010 | Kumar et al. |
| 2010/0104944 A1 | 4/2010 | Saito et al. |
| 2010/0119942 A1 | 5/2010 | Kumar |
| 2010/0151332 A1 | 6/2010 | Lopez et al. |
| 2010/0248033 A1 | 9/2010 | Kumar et al. |
| 2011/0017528 A1 | 1/2011 | Kumar et al. |
| 2011/0052981 A1 | 3/2011 | Lopez et al. |
| 2011/0052989 A1 | 3/2011 | Venkatachalam et al. |
| 2011/0076556 A1 | 3/2011 | Karthikeyan et al. |
| 2011/0111294 A1 | 5/2011 | Lopez et al. |
| 2011/0111298 A1 | 5/2011 | Lopez et al. |
| 2011/0136019 A1 | 6/2011 | Amiruddin et al. |
| 2011/0236751 A1 | 9/2011 | Amiruddin et al. |
| 2011/0244331 A1 | 10/2011 | Karthikeyan et al. |
| 2012/0028105 A1 | 2/2012 | Kumar et al. |
| 2012/0056590 A1 | 3/2012 | Amiruddin et al. |
| 2012/0070725 A1 | 3/2012 | Venkatachalam et al. |
| 2012/0077082 A1 | 3/2012 | Se-Hee et al. |
| 2012/0282521 A1* | 11/2012 | Choi .................. C01G 45/1228 429/211 |

FOREIGN PATENT DOCUMENTS

| | | |
|---|---|---|
| JP | 06-243871 | 9/1994 |
| JP | 09-045373 | 2/1997 |
| JP | 10-255837 | 9/1998 |
| JP | 3112138 | 9/2000 |
| JP | 2001-143703 | 5/2001 |
| JP | 3172388 B2 | 6/2001 |
| JP | 3276451 | 2/2002 |
| JP | 2002-110167 | 4/2002 |
| JP | 2002151077 A * | 5/2002 |
| JP | 2003-221234 | 9/2003 |
| JP | 3506397 | 12/2003 |
| JP | 2005-310744 | 11/2005 |
| JP | 2006-134816 | 5/2006 |
| JP | 2006-261127 | 9/2006 |
| JP | 2006-261132 | 9/2006 |
| JP | 2006-344425 | 12/2006 |
| JP | 2007-220630 A | 8/2007 |
| JP | 2008-251480 | 10/2008 |
| JP | 2008-258160 A | 10/2008 |
| JP | 3157413 B2 | 4/2011 |
| JP | 2011129258 A * | 6/2011 |
| JP | 5023541 | 6/2012 |
| KR | 10-2007-0117827 A | 12/2007 |
| KR | 10-0796953 B1 | 1/2008 |
| KR | 10-0822013 | 4/2008 |
| KR | 10-2008-0099132 A | 11/2008 |
| KR | 10-2009-0078128 A | 7/2009 |
| KR | 10-2010-0007236 | 1/2010 |
| WO | 99/60638 A2 | 11/1999 |
| WO | 01/35473 A1 | 5/2001 |
| WO | 01/91209 A1 | 11/2001 |
| WO | 2004/084330 A2 | 9/2004 |
| WO | 2005/119820 A1 | 12/2005 |
| WO | 2006/025707 A1 | 3/2006 |
| WO | 2006/109930 A1 | 10/2006 |
| WO | 2006/137673 A1 | 12/2006 |
| WO | 2008/086041 A1 | 7/2008 |
| WO | 2010/065494 A2 | 6/2010 |

OTHER PUBLICATIONS

KR 10 2009 0078128 Translation, 37 pages total.*
JP 2011129258 Translation, 36 pages total.*
Donald L. Branson, Kinetics and Mechanism of the Reaction Between Zinc Oxide and Aluminum Oxide, Journal of The American Ceramic Society, vol. 48, No. 11; 5 pages total.*
Takeda JP 2011-129258 Machine Translation; 36 pages total.*
Ahn et al., Deposition of Al doped ZnO layers with various electrical types by atomic layer deposition, Thin Solid Films 519 (2010) 747-750; 4 pages total.*
Fujino, JP2002-151077 Machine Translation; 23 pages total.*
Chen et al., Role of surface coating on cathode materials for lithium-ion batteries, J. Mater. Chem., 2010, 20, 7606-7612; 7 pages total.*

(56) References Cited

OTHER PUBLICATIONS

Ito et al., "A new approach to improve the high-voltage cyclic performance of Li-rich layered cathode material by electrochemical pretreatment," Journal of Power Sources, 183:344-346 (2008).
Jiang et al., "Structure, Electrochemical Properties, and Thermal Stability Studies of Cathode Materials in the xLi[Mn½Ni½]O2•yLiCoO2•zLi[Li⅓Mn⅔]O2 Pseudoternary System (x+y+z=1)," Journal of the Electrochemical Society, 152(9):A1879-A1889 (2005).
Johnson et al., "Lithium-manganese oxide electrodes with layered-spinel composite structures xLi2MnO3•(1-x)Li1+yMn2-yO4 (0<x<1, 0≤y≤0.33) for lithium batteries," Electrochemistry Communications, 7:528-536 (2005).
Johnson et al., "The significance of the Li2MnO3 component in 'composite' xLi2MnO3•(1-x)LiMn0.5Ni0.5O2 electrodes," Electrochemistry Communications, 6:1085-1091 (2004).
Jung et al., "Enhanced Stability of LiCoO2 Cathodes in Lithium-Ion Batteries Using Surface Modification by Atomic Layer Deposition," The Journal of the Electrochemical Society, 157(1):A75-A81 (2010).
Jung et al., "Ultrathin Direct Atomic Layer Deposition on Composite Electrodes for Highly Durable and Safe Li-Ion Batteries," Advanced Materials, A29(22):2172-2176 (2010).
Kang et al., "Enhancing the rate capability of high capacity xLi2Mn03•(1-x)LiMO2 (M=Mn, Ni, Co) electrodes by Li—Ni—PO4 treatment," Electrochemistry Communications, 11:748-751 (2009).
Kang et al., "The Effects of Acid Treatment on the Electrochemical Properties of 0.5 Li2MnO3•0.5 LiNi0.44Co0.25Mn0.31O2 Electrodes in Lithium Cells," Journal of the Electrochemical Society, 153(6):A1186-A1192 (2006).
Kang et al., "Layered Li(Li0.2Ni0.15+0.5zCo0.10Mn0.55-0.5z)O2-zFz cathode materials for Li-ion secondary batteries," Journal of Power Sources, 146:654-657 (2005).
Kim et al., "Remarkable improvement in cell safety for Li[Ni0.5Co0.2Mn0.3]O2 coated with LiFePO4," Journal of Alloys and Compounds 492:L87-L90 (2010).
Kim et al., "Synthesis of spherical Li[Ni(⅓-z)Co(⅓-z)Mn(⅓-z)Mgz]O2 as positive electrode material for lithium ion battery," Electrochimica Acta, 51:2447-2453 (2006).
Kim et al., "Improvement of High-Voltage Cycling Behavior of Surface-Modified Li[Ni⅓Co⅓Mn⅓]O2 Cathodes by Fluorine Substitution for Li-Ion Batteries," Journal of the Electrochemical Society, 152(9):A1707-A1713 (2005).
Kim et al., "Electrochemical and Structural Properties of xLi2M'O3-(1-x)LiMn0.5Ni0.5O2 Electrodes for Lithium Batteries (M'=Ti, Mn, Zr; 0≤x≤0.3)" Chem. Mater., 16:1996-2006 (2004).
Kim et al., "Electrochemical Stability of Thin-Film LiCoO2 Cathodes by Aluminum-Oxide Coating," Chem. Mater., 15(7):1505-1511 (2003).
Lee et al., "High capacity Li[Li0.2Ni0.2Mn0.6]O2 cathode materials via a carbonate co-precipitation method," J. of Power Sources, 162:1346-1350 (2006).
Lee et al., "Electrochemical characteristics of Al2O3-coated lithium manganese spinel as a cathode material for a lithium secondary battery," J. of Power Sources, 126:150-155 (2004).
Luo et al., "On the incorporation of fluorine into the manganese spinel cathode lattice," Solid State Ionics, 180:703-707 (2009).
Myung et al., "Effect of AlF3 Coating on Thermal Behavior of Chemically Delithiated Li0.35[Ni⅓Co⅓Mn⅓]O2," J Phys. Chem. C, 114(10):4710-4718 (2010).
Okumura et al., "Cathode having high rate performance for a secondary Li-ion cell surface-modified by aluminum oxide nanoparticles," J. of Power Sources, 189:471-475 (2009).
Ohsawa et al., "The relationship between crystal structure and the electrochemical reaction of Li-rich insertion materials (1)," (2010).
Park et al., "Physical and electrochemical properties of spherical Li1+x(Ni⅓Co⅓Mn⅓)1-xO2 cathode materials", Journal of Power Sources, 177:177-183 (2008).

Park et al., "Lithium-manganese-nickel-oxide electrodes with integrated layered-spinel structures for lithium batteries," Electrochemistry Communications, 9:262-268 (2007).
Riley et al., "Improved Mechanical Integrity of ALD-Coated Composite Electrodes for Li-Ion Batteries," Electrochemical and Solid State Letters, 14(3):A29-A31 (2011).
Robertson et al., "Mechanism of Electrochemical Activity in Li2MnO3," Chem. Mater., 15:1984-1992 (2003).
Ruberto, "Metastable Alumina from Theory: Bulk, Surface, and Growth of κ-Al2O3," Thesis for the Degree of Doctor of Philosophy, Department of Applied Physics, Chalmers University of Technology and Goteborg University, (2001).
Shin et al., "Improvement of electrochemical properties of Li[Ni0.4Co0.2Mn(0.4-x)]O2-yFy cathode materials at high voltage region," Electrochimica Acta, 52:1477-1482 (2006).
Shin et al., "Synthesis and electrochemical properties of Li[Li(1-2x)/3NixMn(2-x)/3]O2 as cathode materials for lithium secondary batteries," Journal of Power Sources, 112:634-638 (2002).
Song et al., "Two- and three-electrode impedance spectroscopy of lithium-ion batteries," J. of Power Sources, 111:255-267 (2002).
Sun et al., "Effect of AlF3 coating amount on high voltage cycling performance of LiCoO2," Electrochimica Acta, 53:1013-1019 (2007).
Sun et al., "AlF3-Coating to Improve High Voltage Cycling Performance of Li[Ni⅓Co⅓Mn⅓]O2 Cathode Materials for Lithium Secondary Batteries," J. of the Electrochemical Society, 154(3):A168-A172 (2007).
Sun et al., "The preparation and electrochemical performance of solid solutions LiCoO2—Li2MnO3 as cathode materials for lithium ion batteries," J of Power Sources, 159:1353-1359 (2006).
Sun et al., "Significant Improvement of high voltage cycling behavior AlF3-coated LiCoO2 cathode," Electrochemistry Communications, 8:821-826 (2006).
Thackeray et al., "Li2MnO3-stabilized LiMO2 (M=Mn, Ni, Co) electrodes for lithium-ion batteries," J. Mater. Chem., 17:3112-3125 (2007).
Thackeray et al., "Comments on the structural complexity of lithium-rich Li1+xM1-xO2 electrodes (M=Mn,Ni,Co) for lithium batteries," Electrochemistry Communications, 8:1531-1538 (2006).
Thackeray et al., "Advances in manganese-oxide 'composite' electrodes for lithium-ion batteries," J. Mater. Chem., 15:2257-2267 (2005).
Wang et al., "High capacity double-layer surface modified Li[Li0.2Mn0.54Ni0.13Co0.13]O2 cathode with improved rate capability," J. Mater. Chem., 19:4965-4972 (2009).
Woo et al., "Significant Improvement of Electrochemical Performance of AlF3-Coated Li[Ni0.8Co0.1Mn0.1]O2 Cathode Materials," J. of the Electrochemical Society, 154(11):A1005-A1009 (2007).
Wu et al., "High Capacity, Surface-Modified Layered Li[Li(1-x)/3Mn(2-x)/3Nix/3Cox/3]O2 Cathodes with Low Irreversible Capacity Loss," Electrochemical and Solid State Letters, 9(5):A221-A224 (2006).
Yabuuchi et al., "Detailed Studies of a High-Capacity Electrode Material for Rechargeable Batteries, Li2MnO3—LiCo⅓Ni⅓Mn⅓O2," J. Am. Chem. Soc., 133:4404-4419 (2011).
Yabuuchi et al., "Study of Li2MnO3—Li(Co⅓Ni⅓Mn⅓)O2 for High Capacity Positive Electrode Material: II. Redox Reaction at the Positive Electrode/Electrolyte Interface," (2010).
Yoshii et al., "Study of Li2MnO3—Li(Co⅓Ni⅓Mn⅓)O2 for High Capacity Positive Electrode Material: I. Change in the Crystal and Electronic Structure upon Li de-intercalation," (2010).
Zheng et al., "The Effects of AlF3 Coating on the Performance of Li[Li0.2Mn0.54Ni0.13Co0.13]O2 Positive Electrode Material for Lithium-Ion Battery," Journal of the Electrochemical Society, 155(10):A775-A782 (2008).
International Search Report and Written Opinion from corresponding PCT Application No. PCT/US2013/075610, dated Apr. 22, 2014 (12 pages).
Armstrong et al., "Demonstrating Oxygen Loss and Associated Structural Reorganization in the Lithium Battery Cathode Li[NiLiMn]O," J. Am. Chem. Soc., 128(26):8694-8698 (2006).
Aurbach et al., "Studies of cycling behavior, ageing, and interfacial reactions of LiNi0.5Mn1.5O4 and carbon electrodes for lithium-ion 5-V cells," J. of Power Sources, 162:780-789 (2006).

(56) References Cited

OTHER PUBLICATIONS

Aurbach et al., "On the capacity fading of LiCoO2 intercalation electrodes: the effect of cycling, storage, temperature, and surface film forming additives," Electrochimica Acta, 47:4291-4306 (2002).

Boulineau et al., "Reinvestigation of Li2MnO3 Structure: Electron Diffraction and High Resolution TEM," Chem. Mater., 21:4216-4222 (2009).

Chen et al., "Studies of LiCoO2 Coated with Metal Oxides," Electrochemical and Solid State Letters, 6(11):A221-A224 (2003).

Chen et al., "Effect of a ZrO2 Coating on the Structure and Electrochemistry of LixCoO2 When Cycled to 4.5 V," Electrochemical and Solid-State Letters, 5(10):A213-A216 (2002).

Cho et al., "Comparison of Al2O3- and AlPO4-coated LiCoO2 cathode materials for a Li-ion cell," J. of Power Sources, 146:58-64 (2005).

Cho et al., "LiCoO2 Cathode Material That Does Not Show a Phase Transition from Hexagonal to Monoclinic Phase," J. of the Electrochemical Society, 148(10):A1110-A1115 (2001).

Cho et al., "High-Performance ZrO2-Coated LiNiO2 Cathode Material," Electrochemical and Solid-State Letters, 4(10):A159-A161 (2001).

Cho et al., "Zero-Strain Intercalation Cathode for Rechargeable Li-Ion Cell," Angew. Chem. Int. Ed., 40(18):3367-3369 (2001).

Cho et al., "Novel LiCoO2 Cathode Material with Al2O3 Coating for a Li Ion Cell," Chem. Mater., 12(12):3788-3791 (2000).

Choi et al., "Superior Capacity Retention Spinel Oxyfluoride Cathodes for Lithium-Ion Batteries," Electrochemical and Solid-State Letters, 9(5):A245-A248 (2006).

Fey et al., "Enhanced cyclability of LiCoO2 cathodes coated with alumina drived from carboxylate-alumoxanes," J. of Applied Electrochemistry, 35:177-184 (2005).

Fey et al., "Preformed boehmite nanoparticles as coating materials for long-cycling LiCoO2," J. of Applied Electrochemistry, 34:715-722 (2004).

Fey et al., "A simple mechano-thermal coating process for improved lithium battery cathode materials," J. of Power Sources, 132:172-180 (2004).

Fey et al., "Saturated linear dicarboxylic acids as chelating agents for the sol-gel synthesis of LiNi0.8Co0.2O2," Materials Chemistry and Physics, 87:246-255 (2004).

Ho et al., "Application of A-C Techniques to the Study of Lithium Diffusion in Tungsten Trioxide Thin Films," J. Electrochem. Soc., 127(2):343-350 (1980).

Hong et al., "Structural evolution of layered Li1.2Ni0.2Mn0.6O2 upon electrochemical cycling in a Li rechargeable battery," J. Mater. Chem., 20:10179-10186 (2010).

Hwang et al., "Influence of Mn content on the morphology and electrochemical performance of LiNi1-x-yCoxMnyO2 cathode materials," J. Mater. Chem., 13:1962-1968 (2003).

Ito et al., "The relationship between crystal structure and the electrochemical reaction of Li-rich insertion materials (2)," (2010).

Ito et al., "Cyclic deterioration and it's improvement for Li-rich layered cathode material Li[Ni0.17Li0.2Co0.07Mn0.56]O2," Journal of Power Sources, 195:567-573 (2010).

\* cited by examiner

HIGH CAPACITY CATHODE MATERIAL WITH STABILIZING NANOCOATINGS

FIELD OF THE INVENTION

The inventions, in general, are related to improved surface coatings on high capacity lithium metal oxide material to suppress phase transition and voltage fade observed in these materials.

BACKGROUND

Rechargeable lithium ion batteries, also known as secondary lithium ion batteries are desirable as power sources for a wide range of applications. Their desirability stems from their relative high energy density. For some current commercial batteries, the negative electrode material can be graphite, and the positive electrode material can comprise, for example, lithium cobalt oxide ($LiCoO_2$), $LiMn_2O_4$, having a spinel structure, or $LiFePO_4$, having an olivine structure.

The capacities of secondary lithium ion batteries have been greatly improved with the development of high capacity lithium rich metal oxides for use as positive electrode active materials. For some important applications, such as vehicle application, it is desired that secondary lithium ion batteries be able to charge and recharge for many cycles without a great loss of performance. Lithium ion batteries generally can be designed in particular for high energy power output with high current capabilities or high power output with moderate current capabilities. With either type of design, it is desirable for the average voltage and capacity to fade slowly with cycling such that power and energy output correspondingly changes slowly with cycling.

SUMMARY OF THE INVENTION

In a first aspect, the invention pertains to a positive electrode active material that comprises a lithium metal oxide active composition coated with aluminum zinc oxide coating composition. The aluminum zinc oxide can be approximately represented by the formula $Al_xZn_{1-3x/2}O$, where x is from about 0.01 to about 0.6. In some embodiments, x is from about 0.1 to about 0.45. The positive electrode active material can comprise, for example, from about 0.25 mole percent to about 10 mole percent coating composition. In additional embodiments, the positive electrode active material comprises from about 0.5 mole percent to about 7 mole percent coating composition. in some embodiments, the lithium metal oxide composition can comprise a lithium metal oxide approximately represented by the formula $Li_{1+b}M_{1-b}O_{2-z}F_z$, where M is a non-lithium metal element or a combination thereof and $0.01 \leq b \leq 0.3$, $0 \leq z \leq 0.2$. In additional or alternative embodiments, the lithium metal oxide can be approximately represented by a formula of $xLi_2M'O_3 \cdot (1-x)LiM''O_2$, where M' represents one or more metal ions having an average valance of +4 and M'' represents one or more metal ions having an average valance of +3, and $0 < x < 1$. In some embodiments, the lithium metal oxide composition can be approximately represented by a formula $Li_{1+b}Ni_\alpha Mn_\beta Co_\gamma A_\delta O_2$, where b ranges from about 0.05 to about 0.3, $\alpha$ ranges from 0 to about 0.4, $\beta$ range from about 0.2 to about 0.65, $\gamma$ ranges from 0 to about 0.46, and $\delta$ ranges from 0 to about 0.15 with the proviso that both $\alpha$ and $\gamma$ are not zero, and where A is Mg, Sr, Ba, Cd, Zn, Al, Ga, B, Zr, Ti, Ca, Ce, Y, Nb, Cr, Fe, V, or combinations thereof.

The positive electrode active material can have a specific capacity of at least about 175 mAh/g and an average voltage of at least about 3.55V discharged at a rate of C/3 from 4.6V to 2V against lithium. In some embodiments, the positive electrode active material can have a specific capacity at the 80th cycle that is at least about 89% of the 11 cycle specific capacity and an average voltage at the 80th cycle that is at least about 94% of the average voltage of 11 cycles when cycled at a discharge rate of C/3 from 4.6V to 2V against lithium from the 11th cycle to the 80th cycle. In some embodiments, the positive electrode active material can further comprise an overcoat of metal halide over the aluminum zinc oxide coating. In some embodiments, the positive electrode active material can have from about 1 mole percent to about 15 mole percent aluminum zinc oxide coating and from about 0.5 mole percent to about 3 mole percent aluminum halide overcoat.

In another aspect, the invention pertains to a positive electrode active material that comprises a lithium metal oxide active composition coated with sequential layers of an inert metal oxide coating and a metal halide overcoat. In some embodiments, the lithium metal oxide composition can be approximately represented by a formula of $xLi_2M'O_3 \cdot (1-x)LiM''O_2$, where M' represents one or more metal ions having an average valance of +4 and M'' represents one or more metal ions having an average valance of +3, and $0 < x < 1$. In additional or alternative embodiments, the lithium metal oxide composition can be approximately represented by a formula $Li_{1+b}Ni_\alpha Mn_\beta Co_\gamma A_\delta O_2$, where b ranges from about 0.05 to about 0.3, $\alpha$ ranges from 0 to about 0.4, $\beta$ range from about 0.2 to about 0.65, $\gamma$ ranges from 0 to about 0.46, and $\delta$ ranges from 0 to about 0.15 with the proviso that both $\alpha$ and $\gamma$ are not zero, and where A is Mg, Sr, Ba, Cd, Zn, Al, Ga, B, Zr, Ti, Ca, Ce, Y, Nb, Cr, Fe, V, or combinations thereof. In some embodiments, the metal oxide coating comprises $Al_2O_3$, $Al_xZn_{1-3x/2}O$, where x is from about 0.01 to about 0.5, or a combination thereof and the metal halide overcoat comprises an aluminum halide. In some embodiments, the positive electrode active material has from about 0.5 mole percent to about 10 mole percent metal oxide coating and from about 0.5 mole percent to about 3 mole percent metal halide overcoat. The positive electrode active material can have a specific capacity at the 60th cycle that is at least about 94% of the specific capacity at the 11th cycle discharged at a rate of C/3 from 4.6V to 2V against lithium from the 11th cycle to the 60th cycle. In some embodiments, the positive electrode active material has an average voltage at the 60th cycle that is at least about 95% of the average voltage at the 11th cycle discharged at a rate of C/3 from 4.6V to 2V against lithium from the 11th cycle to the 60th cycle. In some embodiments, the metal halide overcoat comprises a metal fluoride.

In a further aspect, the invention pertains to a method for the synthesis of a stabilization coating comprising aluminum zinc oxide on a lithium metal oxide composition, the method can comprise coating the lithium metal oxide composition with an aluminum zinc precursor composition and heating the precursor coated composition to form the aluminum zinc oxide coating on the lithium metal oxide.

BRIEF DESCRIPTION OF THE DRAWINGS

FIG. 7a-7f shows TEM images of sample 7.

FIG. 7g-7h shows TEM images of sample 7a.

DETAILED DESCRIPTION

Figure 1:
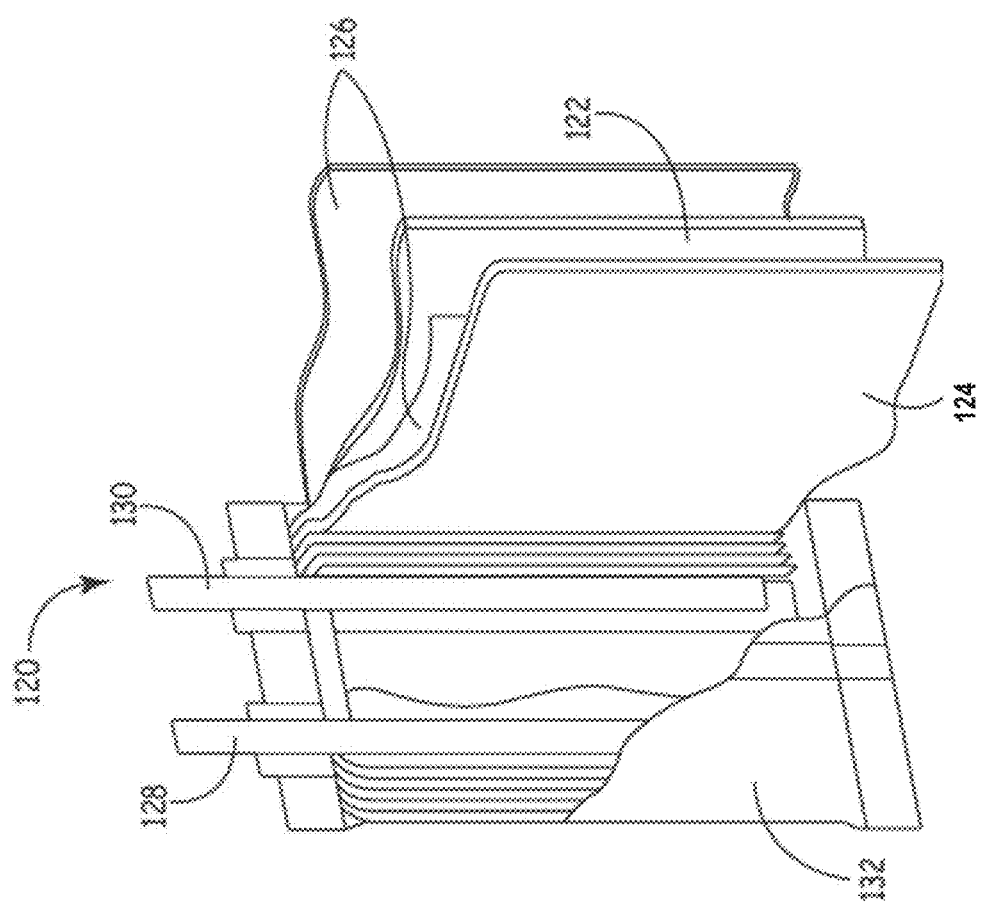
FIG. 1 is schematic diagram of a battery structure separated from a battery container.

Improved stabilization coatings have been found to offer improved material design options for positive electrode active materials based on high capacity lithium rich metal oxides. In particular, inert inorganic coatings can stabilize the lithium rich metal oxides with respect to irreversible changes to the active material associated with cycling and corresponding repeated removal of lithium and re-insertion of lithium into the material. In particular, aluminum zinc oxide coatings have been found to be particularly effective with respect to stabilizing the average voltage of the material during cycling of the battery, while also decreasing the first cycle irreversible capacity loss and stabilizing the capacity during cycling. Furthermore, surprising improvements in performance have been found with the sequential addition of a metal oxide coating followed by a metal halide overcoat. The combined metal oxide coating and metal halide overcoat provide a synergistic performance improvement of resulted positive electrode active material. In general, stabilization coatings are believed to provide stabilization of the crystal structure of the core lithium metal oxide composition during compositional changes that take place during battery cycling. However, a stabilization coating can form a barrier that can restrict lithium extraction from and insertion into the lithium metal oxide composition and also a barrier to electron flow into and out from the lithium metal oxide composition. The aluminum zinc oxides may be more electrically conductive since zinc oxide is a semiconductor and doped zinc oxides can be electrically conductive. In particular, aluminum doped zinc oxide films have been used as transparent conductive films. Based on the aluminum zinc oxide coatings and combined stabilization coatings described herein stable cycling capacity and stable average voltage values can be obtained with cycling.

The batteries described herein are lithium-based batteries in which a non-aqueous electrolyte solution comprises lithium ions. For secondary lithium ion batteries during charge, oxidation takes place at the cathode (positive electrode) where lithium ions are extracted and electrons are released. During discharge, reduction takes place in the cathode where lithium ions are inserted and electrons are consumed. Generally, the batteries are formed with lithium ions in the positive electrode material such that an initial charge of the battery transfers a significant fraction of the lithium from the positive electrode material to the negative electrode material to prepare the battery for discharge. Unless indicated otherwise, performance values referenced herein are at room temperature, i.e., from 22° C. to 25° C.

The word "element" is used herein in its conventional way as referring to a member of the periodic table in which the element has the appropriate oxidation state if the element is in a composition and in which the element is in its elemental form, $M^0$, only when stated to be in an elemental form. Therefore, a metal element generally is only in a metallic state in its elemental form or a corresponding alloy of the metal's elemental form. In other words, a metal oxide or other metal composition, other than metal alloys, generally is not metallic. The term "pristine" is used herein interchangeably with the term "uncoated" to refer to a positive electrode active composition that is not coated with a stabilization coating.

Lithium ion batteries described herein have achieved improved cycling performance associated with the stabilization coatings while exhibiting good specific capacity and high average voltage. The improved cycling performance suggests that the resulting lithium ion batteries can serve as an improved power source, particularly for high energy applications, such as electric vehicles, plug in hybrid vehicles and the like. In general, the stabilization coating described herein can provide desirable improvements in battery performance for a wide range of positive electrode active materials. In some embodiments, the structure of the cathode composition can be, for example, layered-layered, spinel, olivine, layered, and combinations thereof, e.g. layered-spinel structures.

In some embodiments, the lithium ion batteries can use a positive electrode active material that is lithium rich relative to a reference homogenous electroactive lithium metal oxide composition. The excess lithium can be referenced relative to a composition $LiMO_2$, where M is one or more metals with an average oxidation state of +3. The additional lithium in the initial cathode material can provide corresponding greater amounts of cycling lithium that can be transferred to the negative electrode during charging to increase the battery capacity for a given weight of cathode active material. In some embodiments, the additional lithium is accessed at higher voltages such that the initial charge takes place at a higher voltage to access the additional capacity represented by the additional lithium of the positive electrode.

Lithium rich positive electrode active compositions of particular interest can be approximately represented in a single component notation with a formula $Li_{1+b}Ni_\alpha Mn_\beta Co_\gamma A_\delta O_{2-z}F_z$, where b ranges from about 0.05 to about 0.3, α ranges from about 0.1 to about 0.4, β ranges from about 0.2 to about 0.65, γ ranges from about 0 to about 0.46, δ ranges from about 0 to about 0.15, and z ranges from 0 to about 0.2, and where A is Mg, Sr, Ba, Cd, Zn, Al, Ga, B, Zr, Ti, Ca, Ce, Y, Nb, Cr, Fe, V, Li or combinations thereof. Furthermore, emerging cathode active compositions of potential commercial significance are lithium rich as well as a layered-layered multiphase structure in a highly crystalline composition, in which the additional lithium supports the formation of an alternative crystalline phase.

In particular, it is believed that appropriately formed lithium-rich lithium metal oxides have a composite crystal structure in which the excess lithium supports the formation of an alternative crystalline phase, which leads to the multiphased structure. For example, in some embodiments of lithium rich materials, a layered $Li_2MnO_3$ material may be structurally integrated with either a layered $LiMO_2$ component or similar composite compositions with the manganese cations substituted with other transition metal cations with appropriate oxidation states. In some embodiments, the positive electrode material can be represented in two component notation as $x\ Li_2M'O_3 \cdot (1-x)LiMO_2$ where M is one or more metal cations with an average valance of +3 with at least one cation being a Mn ion or a Ni ion such as a combination of Mn, Co, and Ni, and where M' is one or more metal cations with an average valance of +4. These compositions are described further, for example, in published U.S. patent application U.S. Patent Application No. 2011/0052981 to Lopez et al. (the '981 application), entitled "Layer-layer Lithium Rich Complex Metal Oxides with High Specific Capacity and Excellent Cycling," incorporated herein by reference.

It has been observed that the layered-layered lithium rich active materials exhibit a complex electrochemical behavior. For example, the mixed phase lithium rich metal oxide materials can undergo significant irreversible changes during the first charge of the battery, but these lithium rich compositions can still exhibit surprisingly large specific discharge capacity on cycling. Desirable coatings can reduce the first cycle irreversible capacity loss. Also, the cycling can be stabilized, such as with the coatings described herein, such that the high specific capacity can be exploited for a significant number of cycles.

Specific ranges of lithium rich metal oxide compositions have been identified that provide an improved balance between particular performance properties, such as a high specific capacity, performance at higher rates, desired values of DC-resistance, average voltage and cycling properties when incorporated into a lithium based battery in the '981 application cited above and U.S. patent application Ser. No. 13/588,783 to Amiruddin et al. entitled "Lithium Ion Batteries with High Energy Density, Excellent Cycling Capability and Low Internal Impedance", incorporated herein by reference. The stabilization coatings described herein can further improve the performance of these positive electrode active compositions.

When the corresponding batteries with the intercalation-based positive electrode active materials are in use, the intercalation and release of lithium ions from the lattice induces changes in the crystalline lattice of the electroactive material. As long as these changes are essentially reversible, the capacity of the material does not change significantly with cycling. However, the capacity of the active materials is observed to decrease with cycling to varying degrees. Thus, after a number of cycles, the performance of the battery falls below acceptable values, and the battery is replaced. Also, on the first cycle of the battery, generally there is an irreversible capacity loss that is significantly greater than per cycle capacity loss at subsequent cycles. The irreversible capacity loss (IRCL) is the difference between the charge capacity of the new battery and the first discharge capacity. The irreversible capacity loss results in a corresponding decrease in the capacity, energy and power for the cell. The irreversible capacity lose generally can be attributed to changes of the battery materials during the initial charge-discharge cycle that are substantially maintained during subsequent cycling of the battery. Some of the first cycle irreversible capacity losses (IRCL) can be attributed to the positive electrode active materials, and the coated materials described herein can result in a decrease in the irreversible capacity loss of the batteries.

For some of the lithium rich compositions, uncoated cathode compositions can have exceptionally high capacity, e.g. >250 mAh/g during the initial cycles, when cycled to a high voltage cut-off of 4.5 or 4.6 volts. During the first activation cycle, the evolution of oxygen can be associated with a higher IRCL in these type of excess Li containing cathodes, in which the oxygen is generated from the reaction $Li_2MnO_3 \rightarrow MnO_2 + 2Li^+ + 2e^- + \frac{1}{2}O_2$. Also, significant capacity fade can be seen occurring over extended periods of cycling especially at higher currents or discharge rates. A potential contribution to the capacity fade is a higher charge cut-off voltage, which might trigger the possible non-lithium metal ion dissolution, especially Mn, from the positive electrode. The Mn dissolution may occur through a disproportionation reaction of $Mn^{3+}$, specifically $2Mn^{3+} \rightarrow Mn^{2+} + Mn^{4+}$, where the $Mn^{2+}$ is believed to migrate to the electrolyte and to the anode, i.e., negative electrode resulting in a capacity fade. The disproportionation reaction of $Mn^{+3}$ may occur spontaneously with greater frequency at higher temperatures and at greater charge/discharge rates. A desirable stabilization coating may decrease irreversible changes to the lithium metal oxide active materials that can also contribute to capacity fade with cycling as well as the first cycle irreversible capacity loss. By incorporating a metal halide coating on the surface of the high capacity cathode particles, the cycle life of the high capacity cathode based lithium ion cell battery can be improved. While not wanting to be limited by theory, the coatings may stabilize the crystal lattice of the positive electrode active material during the uptake and release of lithium ions so that irreversible changes in the crystal lattice are reduced significantly.

Some materials have been previously studied as stabilizing coatings for positive electrode active materials in lithium ion batteries. For example, the general use of metal fluoride compositions as coatings for cathode active materials, specifically $LiCoO_2$ and $LiMn_2O_4$, is described in published PCT application WO 2006/109930A to Sun et al., entitled "Cathode Active Material Coated with Fluorine Compound for Lithium Secondary Batteries and Method for Preparing the Same," incorporated herein by reference. In the case of $LiN_{1/3}Co_{1/3}Mn_{1/3}O_2$ (L333) and other mixed metal oxides, $AlF_3$ has been studied by Y. K. Sun et al., from Hanyang University, South Korea, as described in articles Sun et al., "$AlF_3$-Coating to Improve High Voltage Cycling Performance of $Li[Ni_{1/3}Co_{1/3}Mn_{1/3}]O_2$ Cathode Materials for Lithium Secondary Batteries," J. of the Electrochemical Society, 154(3), A168-173 (January 2007) and Woo et al., "Significant Improvement of Electrochemical Performance of AlF$_3$-Coated Li[Ni$_{0.8}$Co$_{0.1}$Mn$_{0.1}$]O$_2$ Cathode Materials," J. of the Electrochemical Society, 154(11), A1005-1009 (September 2007), both of which are incorporated herein by reference. A complex coating comprising a mixture of aluminum cations with phosphate anions and halogen anions in a structure referred to as a multinary oxide coating is described in published U.S. Patent Application 2006/0083991 to Ahn et al., entitled "Electrode Active Material with Multi-Element Based Oxide Layers and Preparation Method Thereof," incorporated herein by reference.

It has been found that metal/metalloid fluoride coatings can significantly improve the performance of lithium rich layered compositions for lithium ion secondary batteries. Specifically, thin metal fluoride coatings provide particularly improved performance with performance for many battery parameters of interest peaking at a relatively thin coating thickness of less than 10 nanometers. Improved metal fluoride coatings with appropriately engineered thicknesses are described in published U.S. Patent Application No. 2011/0111298 to Lopez et al, (the '298 application) entitled "Coated Positive Electrode Materials for Lithium Ion Batteries," incorporated herein by reference. Non-fluoride, metal halide (chloride, bromide, and iodide) coatings have been found to provide significant stabilization for lithium rich positive electrode active materials for lithium ion batteries as disclosed in copending published U.S. Patent Application No. 2012/0070725 to Venkatachalam et al., entitled "Metal Halide Coatings on Lithium Ion Battery Positive Electrode Materials and Corresponding Batteries", incorporated herein by reference (hereinafter the '725 application). Various other coatings such as Al$_2$O$_3$, AlPO$_4$, ZrO$_2$, and Bi$_2$O$_3$, etc. to improve the material properties which in turn improves the electrochemical performance have been reported for layered-layered lithium rich metal oxides. See, for example, published U.S. Patent Application No. 2011/0076556 to Karthikeyan et al. (the '556 application), entitled "Metal Oxide Coated Positive Electrode Materials for Lithium-Based Batteries", incorporated herein by reference. Metal oxide coatings were effective to improve performance properties for lithium rich metal oxide positive electrode active materials.

Aluminum zinc oxide coatings have been found to provide particularly desirable performance improvements with respect to layered-layered lithium rich metal oxides. In general, the coating compositions can be represented an approximate formula of Al$_x$Zn$_{1-3x/2}$O, where x is from about 0.01 to about 0.5. In some embodiments, the positive electrode active material comprises from about 0.25 mole percent to about 10 mole percent aluminum zinc oxide coating composition coated over a lithium metal oxide active material.

The aluminum zinc oxide coatings have been found to provide desirable stabilization for layered-layered lithium rich metal oxides. Specifically, aluminum zinc oxide coatings have been found to decrease first cycle irreversible capacity loss, improve cycling stability of specific capacity and improve cycling stability of average voltage. The improved performance is found with batteries that are charged to 4.6V to activate the batteries.

In some embodiments, sequentially layer stabilization coating can provide further improved performance properties. In particular, a metal oxide stabilization coating can be first placed over the electrochemically active lithium metal oxide. Then, a metal halide coating can be placed over the metal oxide stabilization coating. The sequentially layered stabilization coatings are found to provide synergistic improvements in performance that suggest that the different stabilization coatings provide somewhat different stabilization mechanisms, as described further below.

As described herein, a method for the formation of a coated lithium metal oxide powder composition with an aluminum doped zinc oxide coating can comprise a solution phase deposition step and a heating step directed to the dried powder obtained from the deposition step. Specifically, the method comprises precipitating of an aluminum doped zinc oxide composition in the presence of powders of the active lithium metal oxide powder composition to coat the active composition with a coating precursor. Then, after the initially coated active composition is collected and dried, the dried, precursor coated active composition is heated at an appropriate temperature generally above about 300° C. in an atmosphere with oxygen to form the aluminum zinc oxide coating.

After a metal oxide stabilization coating is applied to the active lithium metal oxide, a metal halide overcoat can be applied. The metal halide coating can be applied through a solution based deposition process in which a metal halide is deposited onto the metal oxide coated particles of the active composition. The powder with particles of sequential stabilization coating can then be dried and heated to anneal the metal halide coatings.

It is useful to note that during charge/discharge measurements, the specific capacity of a material depends on the rate of discharge. The greatest specific capacity of a particular material is measured at very slow discharge rates. In actual use, the actual specific capacity is less than the maximum value due to discharge at a faster rate. More realistic specific capacities can be measured using reasonable rates of discharge that are more similar to the rates encountered during actual use. For example, in low to moderate rate applications, a reasonable testing rate involves a discharge of the battery over three hours. In conventional notation this is written as C/3 or 0.33C. Faster or slower discharge rates can be used as desired, and the rates can be described with the same notation.

Rechargeable batteries have a range of uses in, mobile communication devices, such as phones, mobile entertainment devices, such as MP3 players and televisions, portable computers, combinations of these devices that are finding wide use, as well as transportation devices, such as automobiles and fork lifts. The batteries described herein that incorporate desirable positive electrode active materials with respect to specific capacity, tap density, and cycling can provide improved performance for consumers, especially for medium current applications. In particular, the batteries described herein are suitable for vehicle applications, such as in battery packs for hybrid vehicles, plug-in hybrid vehicles and purely electric vehicles. These vehicles generally have a battery pack that is selected to balance weight, volume and capacity. While larger battery packs can provide a greater range on electric operation, larger packs take up more room that is then not available for other purposes and have greater weight that can decrease performance. Thus, due to the high capacity of the batteries described herein, a battery pack that yields a desired amount of total power can be made in a reasonable volume, and these battery packs can correspondingly achieve the excellent cycling performance.

Positive Electrode Active Material

Stabilization coatings have been found to be useful for a wide range of positive electrode active materials for lithium ion batteries. The desirable coatings described herein can be expected to provide cycling stability for a range of active compositions. In general, the lithium ion battery positive electrode materials can be any reasonable positive electrode active material, such as stoichiometric layered cathode materials with hexagonal lattice settings like $LiCoO_2$, $LiNiO_2$, $LiMnO_2$, or the like; cubic spinel cathode materials such as $LiMn_2O_4$, $Li_4Mn_5O_{12}$, or the like; olivine $LiMPO_4$ (M=Fe, Co, Mn, combinations thereof and the like) type materials; layered cathode materials such as $Li_{1+x}(NiCoMn)_{0.33-x}O_2$ ($0 \leq x < 0.3$) systems; layer-layer composites, such as $xLi_2MnO_3 \cdot (1-x)LiMO_2$ where M can be Ni, Co, Mn, combinations thereof and the like; and composite structures like layered-spinel structures such as $LiMn_2O_4 \cdot LiMO_2$. In some embodiments, a lithium rich composition can be referenced relative to a composition $LiMO_2$, where M is one or more metals with an average oxidation state of +3.

Generally, a lithium rich metal oxide composition can be represented approximately with a formula $Li_{1+c}M_{1-d}O_2$, where M represents one or more non-lithium metals, $c \geq 0$, and d is related to c based on the average valence of the metals. When c is greater than 0, the composition is lithium rich relative to the reference $LiMO_2$ composition. The positive electrode active materials of particular interest comprise lithium rich compositions that generally are believed to form a layered-layered composite crystal structure. In the layered-layered composite compositions, c can be approximately equal to d. In some embodiments, c is from about 0.01 to about 0.33, and d is from about c−0.2 to about c+0.2 with the proviso that d≥0. The additional lithium in the initial cathode material can provide to some degree corresponding additional active lithium for cycling that can increase the battery capacity for a given weight of cathode active material.

In some embodiments, the lithium metal oxide compositions specifically comprise Ni, Co and Mn ions with an optional metal dopant. In general, the additional lithium in the lithium rich compositions is accessed at higher voltages such that the initial charge takes place at a relatively higher voltage to access the additional capacity. However, as described herein the material can undergo irreversible changes during an initial high voltage charge step, such that the material that cycles subsequent to the initial charge is not the same material that reacts at high voltage in the initial material. As used herein, the notation (value1≤variable≤value2) implicitly assumes that value 1 and value 2 are approximate quantities.

Lithium rich positive electrode active materials of particular interest can be represented approximately by a formula $Li_{1+b}Ni_\alpha Mn_\beta Co_\gamma A_\delta O_{2-z}F_z$, where b relates to the degree of lithium enrichment, $\alpha$ ranges from about 0 to about 0.4, $\beta$ range from about 0.2 to about 0.65, $\gamma$ ranges from 0 to about 0.46, $\delta$ ranges from 0 to about 0.15 and z ranges from 0 to about 0.2 with the proviso that both $\alpha$ and $\gamma$ are not zero, and where A is a metal different from Mn, Ni, or Co, such as Mg, Sr, Ba, Cd, Zn, Al, Ga, B, Zr, Ti, Ca, Ce, Y, Nb, Cr, Fe, V, Li or combinations thereof. In some embodiments, b ranges from about 0.01 to about 0.3, and particular values of b that have been discovered to contribute to desirable performance values are described further below. Some particularly desirable ranges for the transition metals are also described further below. A person of ordinary skill in the art will recognize that additional ranges of parameter values within the explicit compositional ranges above are contemplated and are within the present disclosure. To simplify the following discussion in this section, the optional fluorine dopant is not discussed further, although the option of a fluorine dopant should still be considered for the particular embodiments. Desirable lithium rich compositions with a fluorine dopant are described further in published U.S. Patent Application 2010/0086854A to Kumar et al., entitled "Fluorine Doped Lithium Rich Metal Oxide Positive Electrode Battery Materials With High Specific Capacity and Corresponding Batteries," incorporated herein by reference. Compositions in which A is lithium as a dopant for substitution for Mn are described in published U.S. Patent Application 2011/0052989A to Venkatachalam et al., entitled "Lithium Doped Cathode Material," incorporated herein by reference. The specific performance properties obtained with +2 metal cation dopants, such as $Mg^{+2}$, are described in published U.S. Patent Application 2011/0244331 to Karthikeyan et al., entitled "Doped Positive Electrode Active Materials and Lithium Ion Secondary Batteries Constructed Therefrom," incorporated herein by reference.

If $b+\alpha+\beta+\gamma+\delta$ is approximately equal to 1, the positive electrode material with the formula above can be represented approximately in two component notation as $x Li_2M'O_3 \cdot (1-x)LiMO_2$ where $0 < x < 1$, M is one or more metal cations with an average valence of +3 within some embodiments at least one cation being a Mn ion or a Ni ion and where M' is one or more metal cations, such as $Mn^{+4}$, with an average valence of +4. As noted above, it is believed that the corresponding material has two distinct physical phases related to the separate components of the two component notation. The multi-phased material is believed to have an integrated layered-layered composite crystal structure with the excess lithium supporting the stability of the composite material. For example, in some embodiments of lithium rich materials, a layered $Li_2MnO_3$ material may be structurally integrated with a layered $LiMO_2$ component where M represents selected non-lithium metal elements or combinations thereof.

Recently, it has been found that the performance properties of the positive electrode active materials can be engineered around the specific design of the composition stoichiometry. The positive electrode active materials of particular interest can be represented approximately in two component notation as $x Li_2MnO_3 \cdot (1-x) LiMO_2$, where M is one or more metal elements with an average valence of +3 and with one of the metal elements being Mn and with another metal element being Ni and/or Co. For example, M can be a combination of nickel, cobalt and manganese, which, for example, can be in oxidation states $Ni^{+2}$, $Co^{+3}$, and $Mn^{+4}$ within the initial lithium manganese oxides. The overall formula for these compositions can be written as $Li_{2(1+x)/(2+x)}Mn_{2x/(2+x)}M_{(2-2x)/(2+x)}O_2$. In the overall formula, the total amount of manganese has contributions from both constituents listed in the two component notation. Thus, in some sense the compositions are manganese rich. The value of x, as with the value of parameter "b" above, relates to the lithium enrichment. In general, $0<x<1$, but in some embodiments $0.03 \leq x \leq 0.55$, and in further embodiments $0.05 \leq x \leq 0.425$. A person of ordinary skill in the art will recognize that additional ranges within the explicit ranges of parameter x above are contemplated and are within the present disclosure.

In some embodiments, M as represented in the two component notation above can be written as $Ni_u Mn_v Co_w A_y$. For embodiments in which y=0, this simplifies to $Ni_u Mn_v Co_w$. If M includes Ni, Co, Mn, and optionally A the composition can be written alternatively in two component notation and single component notation as the following.

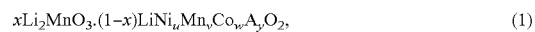

$$xLi_2MnO_3 \cdot (1-x)LiNi_u Mn_v Co_w A_y O_2, \qquad (1)$$

$$Li_{1+b}Ni_\alpha Mn_\beta Co_\gamma A_\delta O_2, \qquad (2)$$

with $u+v+w+y \approx 1$ and $b+\alpha+\beta+\gamma+\delta \approx 1$. The reconciliation of these two formulas leads to the following relationships:

$$b=x/(2+x),$$

$$\alpha=2u(1-x)/(2+x),$$

$$\beta=2x/(2+x)+2v(1-x)/(2+x),$$

$$\gamma=2w(1-x)/(2+x),$$

$$\delta=2y(1-x)/(2+x),$$

and similarly, $$x=2b/(1-b),$$

$$u=\alpha/(1-3b),$$

$$v=(\gamma-2b)/(1-3b),$$

$$w=\gamma/(1-3b),$$

$$y=\delta/(1-3b).$$

In some embodiments, it may be desirable to have $u \approx v$, such that Li $Ni_u Mn_v Co_w A_y O_2$ becomes approximately Li $Ni_u Mn_u Co_w A_y O_2$. In this composition, when y=0, the average valence of Ni, Co and Mn is +3, and if $u \approx v$, then these elements can have valences of approximately $Ni^{+2}$, $Co^{+3}$ and $Mn^{+4}$ to achieve the average valence. When the lithium is hypothetically fully extracted, all of the elements go to a +4 valence. A balance of Ni and Mn can provide for Mn to remain in a +4 valence as the material is cycled in the battery. This balance may avoid or limit the formation of $Mn^{+3}$, which has been associated with dissolution of Mn into the electrolyte and a corresponding loss of capacity.

In some embodiments, the Ni, Mn, Co and A values in the composition formula (2) above can be specified as $0.225 \leq \alpha \leq 0.35$, $0.35 \leq \beta \leq 0.45$, $0.15 \leq \gamma \leq 0.3$, $0 \leq \delta \leq 0.05$, in further embodiments as $0.23 \leq \alpha \leq 0.34$, $0.36 \leq \beta \leq 0.445$, $0.15 \leq \gamma \leq 0.29$, $0 \leq \delta \leq 0.04$, and in other embodiments as $0.24 \leq \alpha \leq 0.33$, $0.38 \leq \beta \leq 0.4425$, $0.15 \leq \gamma \leq 0.275$, $0 \leq \delta \leq 0.0375$, with the proviso that $b+\alpha+\beta+\gamma+\delta \approx 1$. A person of ordinary skill in the art will recognize that additional ranges of composition parameters within the explicit ranges and independently varied between the 4 separate parameters above as well as the lithium enrichment parameter (b) in the ranges in the above paragraphs are contemplated and are within the present disclosure.

In general, various processes can be performed for synthesizing the desired lithium rich metal oxide materials described herein having nickel, cobalt, manganese and additional optional metal cations in the composition and exhibiting the high specific capacity performance. In particular, for example, sol gel, co-precipitation, solid state reactions and vapor phase flow reactions can be used to synthesize the desired materials. In addition to the high specific capacity, the materials can exhibit a good tap density which leads to high overall capacity of the material in fixed volume applications.

Specifically, the synthesis methods based on co-precipitation have been adapted for the synthesis of compositions with the formula $Li_{1+b}Ni_\alpha Mn_\beta Co_\gamma A_\delta O_{2-z}F_z$, as described above. In the co-precipitation process, metal salts are dissolved into an aqueous solvent, such as purified water, with a desired molar ratio. Suitable metal salts include, for example, metal acetates, metal sulfates, metal nitrates, and combination thereof. The concentration of the solution is generally selected between 1M and 3M. The relative molar quantities of metal salts can be selected based on the desired formula for the product materials. Similarly, the dopant elements can be introduced along with the other metal salts at the appropriate molar quantity such that the dopant is incorporated into the precipitated material. The pH of the solution can then be adjusted, such as with the addition of $Na_2CO_3$ and/or ammonium hydroxide, to precipitate a metal hydroxide or carbonate with the desired amounts of metal elements. Generally, the pH can be adjusted to a value between about 6.0 to about 12.0. The solution can be heated and stirred to facilitate the precipitation of the hydroxide or carbonate. The precipitated metal hydroxide or carbonate can then be separated from the solution, washed and dried to form a powder prior to further processing. For example, drying can be performed in an oven at about 110° C. for about 4 to about 12 hours. A person of ordinary skill in the art will recognize that additional ranges of process parameters within the explicit ranges above are contemplated and are within the present disclosure.

The collected metal hydroxide or carbonate powder can then be subjected to a heat treatment to convert the hydroxide or carbonate composition to the corresponding oxide composition with the elimination of water or carbon dioxide. Generally, the heat treatment can be performed in an oven, furnace or the like. The heat treatment can be performed in an inert atmosphere or an atmosphere with oxygen present. In some embodiments, the material can be heated to a temperature of at least about 350° C. and in some embodiments from about 400° C. to about 800° C. to convert the hydroxide or carbonate to an oxide. The heat treatment generally can be performed for at least about 15 minutes, in further embodiments from about 30 minutes to 24 hours or longer, and in additional embodiments from about 45 minutes to about 15 hours. A further heat treatment can be performed at a second higher temperature to improve the crystallinity of the product material. This calcination step for forming the crystalline product generally is performed at temperatures of at least about 650° C., and in some embodiments from about 700° C. to about 1200° C., and in further embodiments from about 700° C. to about 1100° C. The calcination step to improve the structural properties of the powder generally can be performed for at least about 15 minutes, in further embodiments from about 20 minutes to about 30 hours or longer, and in other embodiments from about 1 hour to about 36 hours. The heating steps can be combined, if desired, with appropriate ramping of the temperature to yield desired materials. A person of ordinary skill in the art will recognize that additional ranges of temperatures and times within the explicit ranges above are contemplated and are within the present disclosure.

The lithium element can be incorporated into the material at one or more selected steps in the process. For example, a lithium salt can be incorporated into the solution prior to or upon performing the precipitation step through the addition of a hydrated lithium salt. In this approach, the lithium species is incorporated into the hydroxide or carbonate material in the same way as the other metals. Also, due to the properties of lithium, the lithium element can be incorporated into the material in a solid state reaction without adversely affecting the resulting properties of the product composition. Thus, for example, an appropriate amount of lithium source generally as a powder, such as $LiOH \cdot H_2O$, LiOH, $Li_2CO_3$, or a combination thereof, can be mixed with the precipitated metal carbonate or metal hydroxide. The powder mixture is then advanced through the heating step(s) to form the oxide and then the crystalline final product material. In some embodiments, incorporation of the lithium element can be achieved by a combination of the solution approach and the solid state approach.

Further details of the hydroxide co-precipitation process are described in published U.S. Patent Application 2010/0086853A (the '853 application) to Venkatachalam et al. entitled "Positive Electrode Material for Lithium Ion Batteries Having a High Specific Discharge Capacity and Processes for the Synthesis of these Materials", incorporated herein by reference. Further details of the carbonate co-precipitation process are described in published U.S. Patent Application 2010/0151332A (the '332 application) to Lopez et al. entitled "Positive Electrode Materials for High Discharge Capacity Lithium Ion Batteries", both incorporated herein by reference.

Stabilization Coatings

Stabilization coatings have been found to provide useful structural stabilization of positive electrode active materials, especially layered-layered lithium rich metal oxides, and improved stabilization coatings herein provide desirable attributes. In general, stabilizing coatings seem to stabilize the structure of a lithium metal oxide as the material is cycled through removal and reinsertion of lithium. Performance of lithium ion batteries with cycling is significantly based on the reduced changes of structure and composition during the lithium topotactic process. Of the potential techniques employed to reduce undesired structure modifications of the cathode active materials, surface modification with a nano-coating is believed to be very productive because of the improved electrode-electrolyte interface. The improved coatings described herein have been surprisingly able to stabilize the lithium rich active materials with respect to drop in average voltage during cycling, specific capacity with cycling as well as decreasing the first cycle irreversible capacity loss. Specifically, aluminum zinc oxide coatings provide significantly improved coating performance with respect to material stabilization of layered-layered lithium metal oxide. Furthermore, sequential stabilization layers of a metal oxide coating and a metal halide coating provide surprising synergistic improvement in performance that would not be predicted based on a straightforward increase in coating thickness due to the combined coating. In particular, the combined coatings provide significantly improved cycling at high voltage. In general, the improved coatings may provide the ability to achieve desired cycling performance with a greater extraction of energy from the positive electrode active material.

The layered-layered lithium rich metal oxides are believed to have a multiple phased structure with a $Li_2MnO_3$-type phase. With lithium extraction from the mixed phase material significant structural changes take place during the first charge cycle of the battery, and the changes can result in a significant first cycle irreversible capacity loss associated with the positive electrode active material. Charging the battery during the first cycle to a voltage above roughly 4.4V activates the $Li_2MnO_3$ phase with the specific activation properties depending on the stoichiometry of the material, and only low capacity can be obtained if the positive electrode active material is not activated. As a result of the irreversible changes during activation, the activated positive electrode active material has a different structure than the initial active material before the first charge. Further changes can take place during cycling of the positive electrode active material. Changes in the active material at high voltage can result in instability of the material resulting in dissolution of the transition metals, especially manganese, into the electrolyte from positive electrode active material. The leaching of transition metals from the positive electrode active material into the electrolyte has been associated with a drop in specific capacity. The average voltage has been observed to decrease with cycling independent of the capacity, and this drop in average voltage has been associated with a change of crystal structure. In particular, phase transitions of the positive electrode active material are also associated with a drop in average voltage associated with the formation of lower voltage phases both upon activation as well as with cycling. Thus, coatings can result in stabilization independently corresponding with a drop in irreversible capacity loss (initial changes in the material upon activation), cycling stability of the capacity (dissolution of transition metals and/or transitions to inactive phases), and cycling stability of the average voltage (phase changes of the material).

The aluminum zinc oxide coating composition generally has an approximate formula as determined by analytical analysis, generally ICP-OES (inductively coupled plasma-optical emissions spectroscopy), of $Al_xZn_{1-3x/2}O$, where x is from about 0.01 to about 0.6, in further embodiments from about 0.05 to about 0.5 and in additional embodiments from about 0.1 to about 0.45. With respect to the amount of coating composition, the coated material can comprise from about 0.25 mole percent to about 10 mole percent, in further embodiments from about 0.5 mole percent to about 7 mole percent and in additional embodiments from about 0.75 mole percent to about 6 mole percent. A person of ordinary skill in the art will recognize that additional ranges of stoichiometries (x) and mole percent within the explicit ranges above are contemplated and are within the present disclosure.

The aluminum zinc oxide coatings can be formed using a precipitation of a precursor coating onto the powder of active material followed by the calcination of the coating to form the oxide. The precipitation process can involve a further consideration with respect to implementation since the zinc element tends to deposit in non-stoichiometric amounts relative to the amounts in solution. In general, to deposit the precursor coating for the aluminum zinc oxide coating, a powder of the lithium rich active material is blended with a solution with the dissolved coating metals. Suitable soluble aluminum salt and zinc salt is dissolved in desired concentrations based on a desired coating composition. A solution of hydroxide, carbonate, nitrate or other anion can be added to induce the precipitation. The base solution can be added at a slow rate to induce more uniform coating onto the active particles. The precipitation results in the coating of the active lithium metal oxide with a precursor coating. Suitable precursor coating can comprise corresponding metal hydroxides, metal carbonates or metal nitrates. The metal hydroxides and metal carbonate precursor coating can be deposited through a precipitation process since the addition of ammonium hydroxide and/or ammonium carbonate can be used to precipitate the corresponding precursor coatings. A metal nitrate precursor coating can be deposited through the mixing of the active cathode powder with a metal nitrate solution and then evaporating the solution to dryness to form the metal nitrate precursor coating. The positive electrode active material with a precursor coating can be heated to decompose the coating for the formation of the corresponding metal oxide coating. For example, a metal hydroxide or metal carbonate precursor coating can be heated to a temperature from about 300° C. to about 800° C. for generally from about 1 hr to about 20 hrs. Also, a metal nitrate precursor coating generally can be heated to decompose the coating at a temperature from about 250° C. to about 550° C. for at least about 30 minutes. A person of ordinary skill in the art can adjust these processing conditions based on the disclosure herein for a specific precursor coating composition, and person of ordinary skill in the art will recognize that additional ranges of temperature and time within the explicit ranges above are contemplated and are within the present disclosure.

The aluminum zinc oxide coatings can reduce the irreversible capacity loss by at least about 6%, in further embodiments at least about 7% and in additional embodiments from about 7.5% to about 18%. The aluminum zinc oxide coatings are particularly effective with respect to stabilization of the average voltage with cycling, and changes in the average voltage have been attributed with crystal structure changes with cycling. Specifically, the 60th cycle average voltage can be at least about 96% of the 10th cycle average voltage, in further embodiments at least about 96.5% and in additional embodiments at least about 97.5% of the 10th cycle average voltage when cycles at a discharge rate of C/3 from 4.6V to 2V against lithium. Furthermore, the aluminum zinc oxide coatings can significantly stabilize the material against manganese dissolution. As used herein, manganese dissolution is examined after the first formation cycle. In particular, the batteries are charged first to 4.35V and then from 4.35V to 4.6V at a rate of C/10. The charged batteries are then stored for 1 week fully charged, and then the batteries are fully discharged. After the discharge, the battery is then taken apart, and the anode active material is examined by elemental analysis, e.g., using ICP-AES (inductively coupled plasma, atomic emission spectroscopy. The coated materials can exhibit manganese in the anode of no more than about 190 parts per million by weight (ppm), in other embodiments no more than about 175 ppm and in further embodiments no more than about 160 ppm. A person of ordinary skill in the art will recognize that additional ranges of IRCL reduction and average voltage stabilization within the explicit ranges above are contemplated and are within the present disclosure.

The reactions at the electrode involve the diffusion of lithium ions from the positive electrode active material during charging and into the active material during discharging, along with a corresponding flow of electrons to maintain electrical neutrality. The stabilization coating therefore can be intended to stabilize the underlying crystal structure of the active material without restricting excessively the diffusion of lithium ions or flow of electrons through the coating as a result of the electrochemical reactions in the active material. While a thicker stabilization coating may stabilize the crystal structure of the underlying material more than a thinner coating for some coating materials and some active materials, a thicker coating can impede ion diffusion and/or restrict electron conduction. Therefore, it is surprising that a multiple layered coating can effectively improve performance in ways that suggest potentially more complex interactions between the crystalline active material and the coating material. As described herein, synergistic improvements in performance have been found with combined stabilization coatings of a metal oxide and a metal halide overcoat.

Metal halide stabilization coatings have been found to provide significant stabilization of layered-layered lithium rich metal oxide active materials. In particular, the stabilization provided by the metal halide coatings have been found to reduce first cycle irreversible capacity loss, increase cycling capacity at a specified charge voltage up to at least 4.6V, improve cycling stability of the capacity and improve cycling stability of the average voltage. The characterization of metal fluoride coatings on layered-layered lithium rich metal oxides was provided in the '298 application. The discovery that other metal halide coatings can provide desired stabilization was described in the '725 application. While metal halide stabilization coating can provide desirable battery performance with respect to many performance parameters, if the metal halide coatings are made thicker beyond certain thresholds, performance begins to drop significantly. While not wanting to be limited by theory, the thicker coatings may begin to impede lithium ion diffusion and provide an electrical barrier to charge conduction.

Metal oxide stabilization coatings have been found to provide significant stabilization of layered-layered lithium rich metal oxide active materials. See, for example, the '556 application. However, until the discovery of the aluminum zinc oxides described herein, the metal oxide stabilization coatings have not been as effective as the metal halide with respect to reducing the first cycle irreversible capacity loss or stabilizing the decay of average voltage with cycling. The aluminum zinc oxide stabilizing coatings provide desirable performance improvement of the batteries as summarized above. To a lesser degree than the metal halides, the metal oxide stabilization coatings also seem to exhibit limits with respect to stability with respect to the application of thicker coatings.

Based on a review of coating thickness results, it is surprising then that sequential stabilizations coatings can provide synergistic effects on battery performance. Thus, an inner metal oxide stabilization coating and a metal halide overcoat has been found to provide a synergistic improvement in performance. This synergistic improvement has been found even with the aluminum zinc oxide coating materials, which provide desirable stabilization alone. The results suggest that the different coating materials provide different stabilization mechanisms.

To form the multiple layered coatings, the oxide coating is deposited first as the oxide precursor and calcined to form the oxide coating, and procedures for oxide stabilization coating is summarized above in the context of aluminum zinc oxide coatings. Then, the metal halide coating is deposited over the metal oxide coating. In general, the metal oxide coatings generally comprise compositions that are believed to be essentially inert relative to the electrochemical reactions within the cell. Suitable metal oxides include, for example, aluminum oxide ($Al_2O_3$), bismuth oxide ($Bi_2O_3$), boron oxide ($B_2O_3$), zirconium oxide ($ZrO_2$), magnesium oxide (MgO), chromium oxide ($Cr_2O_3$), magnesium aluminate ($MgAl_2O_4$), gallium oxide ($Ga_2O_3$), silicon oxide ($SiO_2$), tin oxide ($SnO_2$), calcium oxide ($CaO_2$), strontium oxide (SrO), barium oxide (BaO), titanium oxide ($TiO_2$), iron oxide ($Fe_2O_3$), molybdenum oxide ($MoO_3$ and $MoO_2$), cerium oxide ($CeO_2$), lanthanum oxide ($La_2O_3$), zinc oxide (ZnO), lithium aluminum oxide ($LiAlO_2$) or combinations thereof. Aluminum oxide can be desirable due to a low cost and a relative environmentally benign nature. As noted above, aluminum zinc oxide coating materials provide particularly desirable stabilization properties, and the aluminum zinc oxide coatings can be used as an inner coating with a metal halide overcoat.

Metal halide coatings can be formed with fluoride, chloride, bromide, iodide or combinations thereof. Similarly, a range of metals can be incorporated into the metal halide coatings including, for example, Li, Na, Mg, Zn, Ba, Sr, Ca, Al, Ga, In, Zr, Ti, V, Ta, Nb, Mo, W, Ru, other selected metals or combinations thereof.

With respect to the sequentially coated materials, the coated active materials can comprise selected amounts of the respective coating layers to achieve desired performance. In some embodiments, the metal oxide coating can be deposited in amounts from about 0.1 to about 6 mole percent, in further embodiments from about 0.25 mole percent to about 5 mole % and in additional embodiments from about 0.4 to about 4 mole %. With respect to the halide overcoat, desirable stabilization overcoat amounts for non-fluoride metal halides generally are from about 0.025 to about 5 mole percent, in further embodiments from about 0.05 to about 2.5 mole percent, in other embodiments from about 0.075 to about 2 mole percent and in further embodiments from about 0.1 to about 1.5 mole percent. A person of ordinary skill in the art will recognize that additional ranges of coating amounts within the explicit ranges above are contemplated and are within the present disclosure.

A metal halide coating can be deposited using a solution based precipitation approach. A powder of the positive electrode active material, which can have a previously formed metal oxide stabilization coating, can be mixed in a suitable solvent, such as an aqueous solvent. A soluble composition of the desired metal/metalloid ion(s) can be dissolved in the solvent. Then, $NH_4X$, X=F, Cl, Br and/or I, can be gradually added to the dispersion/solution to precipitate the metal halide. The total amount of coating reactants can be selected to form the desired thickness of coating, and the ratio of coating reactants can be based on the stoichiometry of the coating material. The coating mixture can be heated during the coating process to reasonable temperatures, such as in the range from about 60° C. to about 100° C. for aqueous solutions from about 20 minutes to about 48 hours, to facilitate the coating process. After removing the coated electroactive material from the solution, the material can be dried and heated to temperatures generally from about 250° C. to about 600° C. for about 20 minutes to about 48 hours to complete the formation of the coated material. The heating can be performed under a nitrogen atmosphere or other substantially oxygen free atmosphere.

With sequential coatings of a metal oxide and a metal halide, synergistic improvement in performance is observed. In particular, with the combined sequential coatings, both the capacity and the average voltage exhibit excellent cycling stability. In particular, the cycling stability of the average voltage can be comparable to the stability observed with aluminum zinc oxide coatings noted above, and the capacity cycling stability can be significantly improved relative to the cycling stability observed with oxide coating alone. It is surprising that the capacity stability increases with the added coating.

Battery Structure and Pouch Batteries

Lithium ion batteries generally comprise a positive electrode, a negative electrode, a separator between the negative electrode and the positive electrode and an electrolyte comprising lithium ions. The electrodes are generally associated with metal current collectors. Lithium ion batteries refer to batteries in which the negative electrode active material is a material that takes up lithium during charging and releases lithium during discharging. A battery can comprise multiple positive electrodes and multiple negative electrodes, such as in a stack, with appropriately placed separators. Electrolyte in contact with the electrodes provides ionic conductivity through the separator between electrodes of opposite polarity. A battery generally comprises current collectors associated respectively with negative electrode and positive electrode. The basic battery structures and compositions are described in this section. Also, improved battery structures and corresponding pouch cell designs are described to take advantage of the decreased electrical resistance that can be obtained with the desired positive electrode active compositions described herein. The resulting improved battery structures can exhibit superior performance properties described herein.

The nature of the negative electrode intercalation/alloying material influences the resulting voltage of the battery since the voltage is the difference between the half cell potentials at the cathode and anode. Suitable negative electrode (anode) lithium intercalation/alloying compositions can include, for example, graphite, synthetic graphite, coke, fullerenes, other graphitic carbons, hard carbon, niobium pentoxide, tin alloys, silicon, titanium oxide, tin oxide, and lithium titanium oxide, such as $Li_xTiO_2$, $0.5<x\le1$ or $Li_{1+x}Ti_{2-x}O_4$, $0\le x\le 1/3$. The graphitic carbon and metal oxide negative electrode compositions take up and release lithium through an intercalation or similar process. Silicon and tin alloys form alloys with the lithium metal to take up lithium and release lithium from the alloy to correspondingly release lithium. In general, the primary electroactive composition used in the negative electrode can be used to describe the negative electrode. The term "carbon based negative electrode" is used to refer to an electrode that has an active material comprising predominantly an elemental carbon material, such as graphite, synthetic graphite, coke, fullerenes, other graphitic carbons, hard carbon, or a combination thereof as the primary electroactive composition. Graphite, synthetic graphite and other graphitic carbons can be collectively referred to as graphitic carbons. Carbon based materials can be desirable for use in certain battery applications since some of these materials are presently believed to be the only reliable negative electrode active material that can operate at relatively high voltages with cycling out to 1000 cycles or more.

The positive electrode active compositions and negative electrode active compositions generally are powder compositions that are held together in the corresponding electrode with a polymer binder. The binder provides ionic conductivity to the active particles when in contact with the electrolyte. Suitable polymer binders include, for example, polyvinylidine fluoride (PVDF), polyethylene oxide, polyethylene, polypropylene, polyimide, polytetrafluoroethylene, polyacrylates, rubbers, e.g. ethylene-propylene-diene monomer (EPDM) rubber or styrene butadiene rubber (SBR), copolymers thereof, or mixtures thereof. For PVDF binders, the polymer can have a molecular weight of at least about 800,000 AMU. The use of high molecular weight PVDF polymers has been found to provide for higher powder loadings into the positive electrode without adversely changing the performance of the battery while obtaining a mechanically stable electrode, as disclosed in U.S. Pat. No. 8,187,752 to Buckley et al. (hereinafter the '752 patent), entitled "High Energy Lithium Ion Secondary Batteries," incorporated herein by reference. The particle loading of positive electrode active material in the electrode can be large, such as greater than about 85 weight percent, in some embodiments from about 86 to about 95 percent, and in further embodiments from about 88 to about 94 percent. A person of ordinary skill in the art will recognize that additional ranges of active material loading within the explicit range above are contemplated and are within the present disclosure.

To form the electrode, the electroactive powders can be blended with the polymer binder in a suitable liquid, such as a solvent for the polymer. The resulting paste can be pressed into the electrode structure. In general, a positive electrode used herein can comprise from about 1 weight percent to about 10 weight percent binder, in some embodiments, from about 1.5 weight percent to about 8 weight percent, in further embodiments from about 2 weight percent to about 6 weight percent. Sufficient binder is generally included in the electrode to maintain mechanical integrity of the electrode such that current can flow to the current collector with a low resistance. A person of ordinary skill in the art will recognize that additional ranges of binder amounts within the explicit ranges above are contemplated and are within the present disclosure.

The positive electrode generally also comprises an electrically conductive powder distinct from the electroactive composition. Suitable supplemental electrically conductive powders include, for example, graphite, carbon black, metal powders, such as silver powders, metal fibers, such as stainless steel fibers, and the like, and combinations thereof. The inclusion of a greater amount of electrically conductive material can decrease the electrical resistance in the electrode, but the inclusion of more electrically conductive power generally corresponds with a decrease in the active material loading that decreases energy density and other performance related parameters. Generally, in some embodiments, a positive electrode can comprise from about 1 weight percent to about 10 weight percent, in some embodiments from about 1.5 weight percent to about 8 weight percent, and in further embodiments from about 2 weight percent to about 7 weight percent distinct electrically conductive powder, such as conductive carbon. A person of ordinary skill in the art will recognize that additional ranges of amounts of electrically conductive powders within the explicit ranges above are contemplated and are within the present disclosure.

The carbon based negative electrodes may or may not comprise an electrically conductive non-active component since the carbon based active material may be sufficiently electrically conductive. If the negative electrode comprises a conductive powder in addition to the active material, the negative electrode generally can comprise from about 0.5 to about 10 weight percent, in further embodiments from about 0.75 to about 7 weight percent and in additional embodiments from about 1 to about 5 weight percent distinct electrically conductive powder, such as conductive carbon. The particle loading of carbon based active material in the negative electrode can be, for example, greater than about 85 weight percent, in some embodiments from about 87 to about 98 percent, and in further embodiments from about 90 to about 96 weight percent. To form the negative electrode, carbon based electroactive powders can be blended with the polymer binder in a suitable liquid, such as a solvent for the polymer. The resulting paste can be pressed into the electrode structure. In general, a negative electrode can comprise from about 1 weight percent to about 10 weight percent binder, in some embodiments, from about 1.5 weight percent to about 8 weight percent, in further embodiments from about 2 weight percent to about 6 weight percent binder. A person of ordinary skill in the art will recognize that additional ranges of negative electrode active material, conductive powder and binder loadings within the explicit ranges above are contemplated and are within the present disclosure.

The electrode generally is associated with an electrically conductive current collector to facilitate the flow of electrons between the electrode and an exterior circuit. The current collector can comprise metal, such as a metal foil or a metal grid. In some embodiments, the current collector can be formed from nickel, aluminum, stainless steel, copper or the like. For example, copper foil can be used as current collectors for negative electrodes, and aluminum foil can be used as positive electrode current collectors. The electrode material as a paste or slurry can be cast as a thin film onto the current collector. For an electrode stack, the electrodes can be coated on both sides of the current collector, although the end electrodes may or may not be coated on both sides. The electrode material with the current collector can then be dried, for example in an oven, to remove solvent from the electrode. In some embodiments, the dried electrode material in contact with the current collector foil or other structure can be subjected to a pressure, such as, from about 2 to about 10 kg/cm$^2$ (kilograms per square centimeter). The electrodes can be pressed using calendering rolls, a press with a die or other suitable processing apparatus to compress the electrodes to a desired thickness. An increased pressure on the electrode can correspondingly increase the electrode density, but a density that is too high can seriously degrade performance. So the design of the electrode and the selection of materials significantly influences the densities that can be achieved with desirable battery performance.

The separator is located between the positive electrode and the negative electrode. The separator is electrically insulating while providing for at least selected ion conduction between the two electrodes. A variety of materials can be used as separators. Commercial separator materials are generally formed from polymers, such as polyethylene and/or polypropylene that are porous sheets that provide for ionic conduction. Commercial polymer separators include, for example, the Celgard® line of separator material from Hoechst Celanese, Charlotte, N.C. Also, ceramic-polymer composite materials have been developed for separator applications. These composite separators can be stable at higher temperatures, and the composite materials can significantly reduce the fire risk. Polymer-ceramic composites for lithium ion battery separators are sold under the trademark Separion® by Evonik Industries, Germany.

We refer to solutions comprising solvated ions as electrolytes, and ionic compositions that dissolve to form solvated ions in appropriate liquids are referred to as electrolyte salts. Electrolytes for lithium ion batteries can comprise one or more selected lithium salts. Appropriate lithium salts generally have inert anions. Suitable lithium salts include, for example, lithium hexafluorophosphate, lithium hexafluoroarsenate, lithium bis(trifluoromethyl sulfonyl imide), lithium trifluoromethane sulfonate, lithium tris(trifluoromethyl sulfonyl) methide, lithium tetrafluoroborate, lithium perchlorate, lithium tetrachloroaluminate, lithium chloride, lithium difluoro oxalato borate, lithium bis-oxalato borate, and combinations thereof. Traditionally, the electrolyte comprises a 1 M concentration of the lithium salts, although greater or lesser concentrations can be used.

For lithium ion batteries of interest, a non-aqueous liquid is generally used to dissolve the lithium salt(s). The solvent generally does not dissolve the electroactive materials. Appropriate solvents include, for example, propylene carbonate, dimethyl carbonate, diethyl carbonate, 2-methyl tetrahydrofuran, dioxolane, tetrahydrofuran, methyl ethyl carbonate, γ-butyrolactone, dimethyl sulfoxide, acetonitrile, formamide, dimethyl formamide, triglyme (tri(ethylene glycol)dimethyl ether), diglyme (diethylene glycol dimethyl ether), DME (glyme or 1,2-dimethyloxyethane or ethylene glycol dimethyl ether), nitromethane and mixtures thereof. Particularly useful solvents for high voltage lithium-ion batteries are described further in published U.S. patent application 2011/0136019 filed on Dec. 4, 2009 to Amiruddin et al. (the '019 application), entitled "Lithium Ion Battery With High Voltage Electrolytes and Additives," incorporated herein by reference. The high voltage electrolytes can comprise $LiPF_6$ and/or $LiBF_4$ at a total concentration from about 0.9M to about 2.5M and a solvent comprising ethylene carbonate and a liquid organic solvent comprising dimethyl carbonate, methyl ethyl carbonate, γ-butyrolactone, γ-valerolactone or a combination thereof. To stabilize the cycling properties of batteries with the electrolytes, the electrolytes can further comprise from about 0.01 weight percent to about 5 weight percent of a lithium salt additive, such as lithium difluoro oxalato borate or lithium bis(oxalato)borate and/or an organic additive, such as vinylene carbonate. Also, high voltage electrolytes with good low temperature behavior are described in copending U.S. patent application Ser. No. 13/325,367 to Li et al., entitled "Low Temperature Electrolyte for High Capacity Lithium Based Batteries," incorporated herein by reference.

The electrodes described herein can be incorporated into various commercial battery designs. For example, the cathode compositions can be used for pouch cell batteries, prismatic shaped batteries, wound cylindrical batteries, coin batteries or other reasonable battery shapes. The batteries can comprise a single cathode structure or a plurality of cathode structures assembled in parallel and/or series electrical connection(s).

In some embodiments, the positive electrode and negative electrode can be stacked with the separator between them, and the resulting stacked structure can be placed into a cylindrical or prismatic configuration to form the battery structure. Appropriate electrically conductive tabs can be welded or the like to the current collectors, and the resulting jellyroll or stack structure can be placed into a metal canister or polymer package, with the negative tab and positive tab welded to appropriate external contacts. Electrolyte is added to the canister, and the canister is sealed to complete the battery. Some presently used rechargeable commercial batteries include, for example, the cylindrical 18650 batteries (18 mm in diameter and 65 mm long) and 26700 batteries (26 mm in diameter and 70 mm long), although other battery sizes can be used.

A schematic diagram of a pouch battery is shown in FIG. 1. Specifically, a pouch cell battery 120 is shown schematically having a negative electrode 122, a positive electrode 124 and a separator 126 between negative electrode 122 and positive electrode 124. A pouch battery can comprise multiple positive electrodes and multiple negative electrodes, such as in a stack, with appropriately placed separators. The separator can be folded with the electrode structures placed in the folds of the separator. Electrolyte in contact with the electrodes provides ionic conductivity through the separator between electrodes of opposite polarity. A battery generally comprises current collectors 128, 130 associated respectively with negative electrode 122 and positive electrode 124. The stack of electrodes and separators can be enclosed in a laminated film casing 132. With respect to some specific embodiments, pouch batteries can be constructed as described in the '752 patent and published U.S. patent application 2012/0028105 to Kumar et al., entitled, "Battery Packs for Vehicles and High Capacity Pouch Secondary Batteries for Incorporation Into Compact Battery Packs," both of which are incorporated herein by reference.

EXAMPLES

To test positive electrode materials with different stabilizing nanocoatings, coin cell batteries were constructed and tested against lithium foil as the counter electrode. The general procedure for formation of the coin batteries is described in the following discussion. The individual examples below describe the synthesis of positive electrode materials with different nanocoatings and the performance results from the coin cell batteries formed therefrom. All percentages reported in the examples are in weight percent, unless specifically indicated otherwise. Besides the formula $Al_xZn_{1-3x/2}O$, notations such as AlZnO and/or AlxZnyOz are used herein to generally refer to the aluminum zinc oxide coating without providing specific details of stoichiometry.

The examples below in general use high capacity lithium metal oxides (LMO) as active compositions that are coated with a stabilizing nanocoating to form the positive electrode active material. The high capacity active compositions can be approximately represented by the formula $Li_{1+b}Ni_\alpha Mn_\beta Co_\gamma A_\delta O_2$ with $0.05 \leq b \leq 0.125$, $0.225 \leq \alpha \leq 0.35$, $0.35 \leq \beta \leq 0.45$, $0.15 \leq \gamma \leq 0.3$, $0 \leq \delta \leq 0.05$, where A is a metal different from lithium, nickel, manganese and cobalt, and up to five mole percent of the oxygen can be replaced with a fluorine dopant. These active compositions can be further represented approximately in two component notation as x $Li_2MnO_3 \cdot (1-x)$ $LiMO_2$ as discussed above, where M is a combination of nickel, cobalt and manganese as discussed above. High capacity cathode materials with LMO compositions 1-3 outlined in the Table 1 below were synthesized using a procedure disclosed in the '853 application and the '332 application. The stoichiometry of LMO compositions 1-3 are outlined in Table 1 below where x refers to the parameter in the two component notation.

TABLE 1

| LMO Composition | x | Mg | Mn (% transition metals) |
|---|---|---|---|
| 1 | 0.175 | 0 | 45 |
| 2 | 0.3 | 0.01 | 51 |
| 3 | 0.525 | 0 | 66 |

Positive electrodes were formed from the high capacity positive electrode material powders by initially mixing it thoroughly with conductive carbon to form a homogeneous powder mixture. Separately, polyvinylidene fluoride (PVDF, KF1300™ from Kureha Corp., Japan) was mixed with N-methyl-pyrrolidone (NMP, Sigma-Aldrich) and stirred overnight to form a PVDF-NMP solution. The homogeneous powder mixture was then added to the PVDF-NMP solution and mixed for about 2 hours to form homogeneous slurry. The slurry was applied onto an aluminum foil current collector to form a thin, wet film and the laminated current collector was dried in vacuum oven at 110° C. for about two hours to remove NMP. The laminated current collector was then pressed between rollers of a sheet mill to obtain a desired lamination thickness. The dried positive electrode comprised about 80 weight percent active metal oxide, about 10 weight percent conductive carbon, and about 10 weight percent PVDF binder unless specified otherwise. Synthesis of the stabilization coatings is described below.

A negative electrode was formed from elemental lithium that is a lithium foil (FMC Lithium) having thickness of 125-150 microns. An electrolyte was selected to be stable at high voltages, and appropriate electrolytes are described in the '019 application above. The electrodes were then placed inside an argon filled glove box for the fabrication of the coin cell batteries. A trilayer (polypropylene/polyethylene/polypropylene) micro-porous separator (2320 from Celgard, LLC, NC, USA) soaked with electrolyte was placed between the positive electrode and the negative electrode. A few additional drops of electrolyte were added between the electrodes. The electrodes were then sealed inside a 2032 coin cell hardware (Hohsen Corp., Japan) using a crimping process to form a coin cell battery. The resulting coin cell batteries were tested with a Maccor cycle tester to obtain charge-discharge curve and cycling stability over a number of cycles. In general, the coin cell batteries were cycled in a voltage window of 2.0-4.6 V at different currents, at the rates ranging from C/10 to 2C.

Example 1

Synthesis of Cathode Materials that has a AlZnO Nanocoating

In this example, mixed metal oxide nanomaterial aluminum zinc oxide (referred to in the examples for simplicity as AlZnO although formally represented approximately as $Al_xZn_{(1-3x/2)}O$ as described in detail above) was used to coat the composition 1 to form positive electrode active material with different amounts of AlZnO nanocoating. The positive electrode active material was analyzed and formed into coin cell batteries with lithium metal counter electrode to evaluate the performance.

The AlZnO coating was deposited on the surface of LMO through a water based coating process. Specifically, Al$(NO_3)_3$-9H$_2$O was used as a precursor for Al, and ZnSO$_4$-7H$_2$O or Zn(NO$_3$)$_2$-6H$_2$O was used as a precursor for Zn. Using Zn from a nitrate salt may have a slight benefit in that no unwanted sulfur is precipitated with the coating onto the material. Both precursors were dissolved in DI (deionized) water in a reaction beaker in a target molar ratio with respect to the desired coating amount. The corresponding base solution (NH$_4$OH in DI water) was also prepared. Once the Al/Zn precursors were fully dissolved, the LMO active composition was added to the reaction beaker and allowed to mix thoroughly. The base solution was then added using a peristaltic pump at a pre-determined flow rate (standard is 4 mL/min, though a slower rate of 0.6 mL/min was also used) while the reaction mixture was being mixing on a stir plate. Once the addition of base solution was complete, the reaction beaker was covered fully with parafilm and mixed for about 2 hours at 60° C. before the mixing was stopped and reaction mixture was allowed to settle. The supernatant was then decanted from the reaction mixture before the resulting material was vacuum filtered until dry to form a dried powder. The dried powder was then loaded into a crucible and heated in a box furnace (ambient conditions) at 400° C. for about 5 hours to form a final powder. The final powder was then sieved through a 45 um sieve to form the positive electrode active material with AlZnO nanocoating. Physical characterization of the sieved final powder was evaluated using on-site XRD, ICP-OES, and SEM. TEM was done at EAG Labs in Sunnyvale, Calif.

Compositions 2-9 of the positive electrode active materials of different AlZnO contents coated onto X=0.175 cathode material formed above were analyzed by ICP analysis and listed in Table 2 below. A range of AlZnO coatings amounts were coated onto the X=0.175 HCMR cathode material. Based on the precipitation dynamics, it is observed that aluminum is preferentially deposited into the coating from the solution relative to the solution qualities of the metal ions. As shown in Table 2, the amount of actual Al detected in the compositions is close to a target amount corresponding to a stoichiometric amount of aluminum in the coating solution whereas the amount of actual Zn detected in the compositions is much lower than a target amount based on the amount of metal in solution. According to ICP compositional analysis, both Al and Zn were precipitated during the coating process. Later studies showed that zinc precipitation is also affected by factors such as the type and concentration of the base used and the flow rate of the base solution addition.

Figure 2:
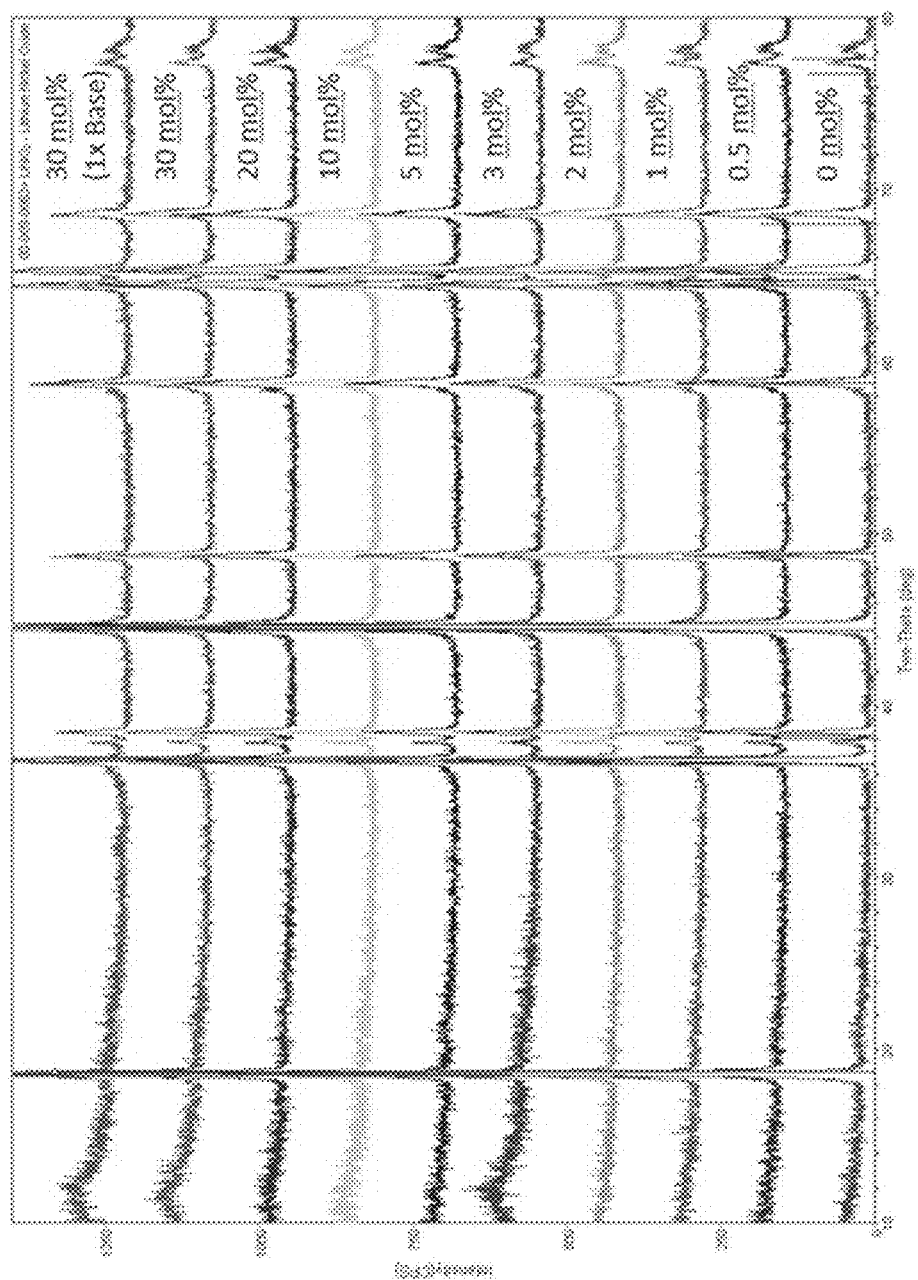
FIG. 2 is a plot of XRD of materials of Table 2 coated with different amounts of AlZnO.

X-ray diffraction measurement (XRD) measurements of the compositions listed in Table 2 as well as a control sample 1 and a high base content treated sample 10 (30 mol %, 1× base) were performed and shown in FIG. 2. The XRD spectra did not show any impurity peaks, even when adding a coating of up to relatively high mol % AlZnO, which suggests that no impurity crystal structures were formed, so only an iso-structural or amorphous coating seems to be formed. It also suggests that even when NH$_4$OH were added at a doubled concentration in the highest concentration coating solution, no detectable spinel type of structure were formed in the samples to signify Li leaching of the LMO. The ICP values in table 2 also are consistent with no significant amount Li leaching.

TABLE 2

| Sample No. | Target AlZnO mol % | Li | Ni | Co | Mn | Al Target | Zn Target | Al | Zn |
|---|---|---|---|---|---|---|---|---|---|
| 2 | 0.5 | 1.082 | 0.245 | 0.262 | 0.411 | 0.0005 | 0.0045 | 0.0008 | 0.0044 |
| 3 | 1 | 1.085 | 0.244 | 0.261 | 0.410 | 0.001 | 0.009 | 0.001 | 0.0076 |
| 4 | 2 | 1.082 | 0.245 | 0.262 | 0.412 | 0.002 | 0.018 | 0.002 | 0.011 |
| 5 | 3 | 1.086 | 0.244 | 0.261 | 0.409 | 0.003 | 0.027 | 0.003 | 0.015 |
| 6 | 5 | 1.078 | 0.245 | 0.263 | 0.414 | 0.005 | 0.045 | 0.005 | 0.015 |
| 7 | 10 | 1.083 | 0.243 | 0.261 | 0.413 | 0.010 | 0.090 | 0.010 | 0.014 |
| 8 | 20 | 1.073 | 0.249 | 0.262 | 0.416 | 0.020 | 0.180 | 0.019 | 0.016 |
| 9 | 30 | 1.071 | 0.250 | 0.263 | 0.416 | 0.030 | 0.270 | 0.029 | 0.019 |

Figure 3:
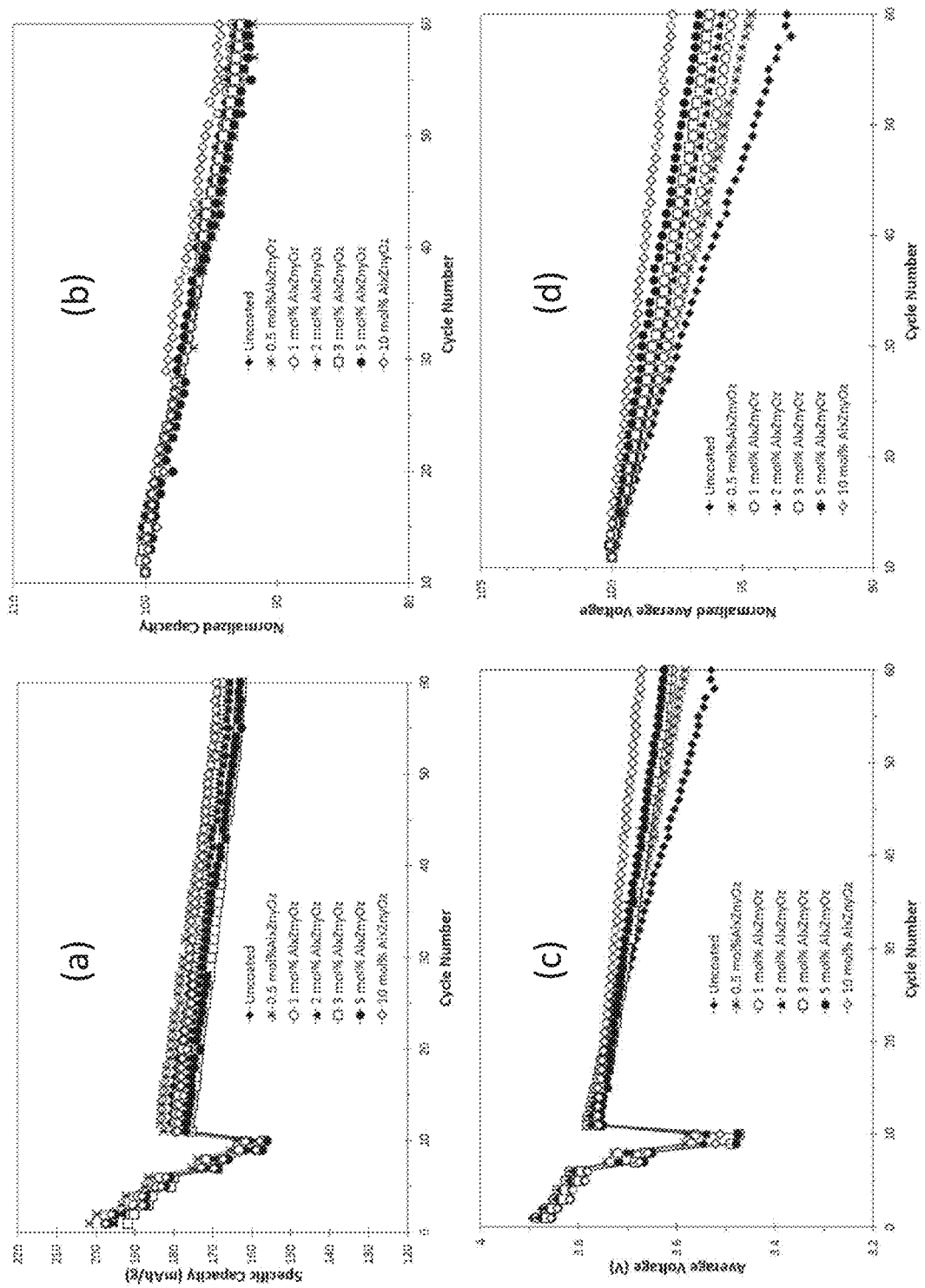
FIG. 3a is a plot showing the specific capacity of batteries formed from samples 1-9 using X=0.175 cathode material uncoated or coated with a target 0.5-10 mol % AlZnO.
FIG. 3b is a plot showing the normalized specific capacity of batteries formed from samples 1-9 using X=0.175 cathode material uncoated or coated with a target 0.5-10 mol % AlZnO.
FIG. 3c is a plot showing the average voltage of batteries formed from samples 1-9 using X=0.175 cathode material uncoated or coated with a target 0.5-10 mol % AlZnO.
FIG. 3d is a plot showing the normalized average voltage of batteries formed from samples 1-9 using X=0.175 cathode material uncoated or coated with a target 0.5-10 mol % AlZnO.

Coin cell batteries with cathode made from the positive electrode active material with AlZnO nanocoating and lithium metal counter electrode was constructed based on the procedure outlined above. The electrochemical performance of the coin cells was evaluated. The performance of samples 1-7 were measured to give specific capacity, normalized specific capacity, average voltage, and normalized average voltage shown in FIGS. 3 (a) to 3(d), respectively. Additionally, the electrochemical performance of these coin cell batteries were evaluated and compared in table 3 below. The specific capacity listed in the table is in mAh/g.

TABLE 3

| Sample | Target Coating | C/10 C | C/10 D | IRCL | C/5 | C/3 | 1 C | 2 C | Avg. V |
|---|---|---|---|---|---|---|---|---|---|
| 1 | Pristine | 245 | 199 | 46 | 191 | 185 | 172 | 161 | 3.903 |
| 2 | 0.5 mol % | 248 | 202 | 46 | 193 | 187 | 175 | 165 | 3.886 |
| 3 | 1 mol % | 242 | 198 | 44 | 190 | 184 | 173 | 163 | 3.886 |
| 4 | 2 mol % | 239 | 196 | 43 | 189 | 183 | 171 | 161 | 3.885 |
| 5 | 3 mol % | 234 | 192 | 42 | 186 | 181 | 169 | 158 | 3.865 |
| 6 | 5 mol % | 242 | 197 | 45 | 187 | 182 | 167 | 157 | 3.853 |
| 7 | 10 mol % | 240 | 197 | 43 | 188 | 183 | 170 | 159 | 3.856 |
| 8 | 20 mol % | 234 | 194 | 40 | 186 | 181 | 167 | 156 | 3.853 |
| 9 | 30 mol % | 226 | 189 | 37 | 182 | 177 | 163 | 152 | 3.834 |

As indicated in FIGS. 3(a) to 3(d) and Table 3, increasing AlZnO content provides improvement in average voltage stability over cycling. The capacity does drop correspondingly with greater amounts of coating in the material, but in sample 7 with a 10 mol % target AlZnO, a decrease of only around 6 mAh/g in C/10 capacity was observed. The coated material also showed slightly improved capacity at higher cycling rate, for example, at 2C, the capacities of coated and uncoated materials were about the same. The average voltage of the batteries with cycling increased with the increased AlZnO coating content: the curve with the worst fade being uncoated, and the curve with the least voltage fade being sample 7 with a 10 mol % target AlZnO coating. Samples 8 and 9 with 20 and 30 mol % target AlZnO coating respectively were also tested and showed no further improvement over sample 7 with a 10 mol % target AlZnO coating.

Example 2

Study of AlZnO Coatings on Different X Cathode Materials

This example provides studies of a AlZnO coating on cathode compositions 2 and 3 of Table 1.

The same coating process described in Example 1 with a 10 mol % target AlZnO was performed with X=0.3 and X=0.5 lithium rich LMO materials to make samples 11 and 12, respectively. Since cathode materials with higher X value are presumed to have more $Li_2MnO_3$ in their structure, these materials are expected to be more prone to instabilities in the material relative to materials with less lithium enrichment.

Figure 4B:
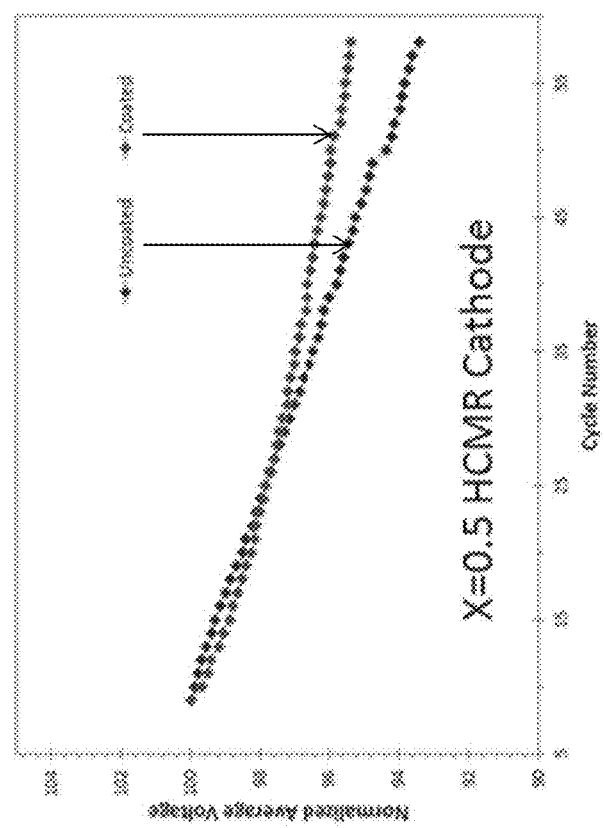
FIG. 4b is a plot of normalized average voltage of batteries formed from sample 12 using X=0.5 HCMR cathode materials with or without a target 10 mol % AlZnO coating.
Figure 4A:
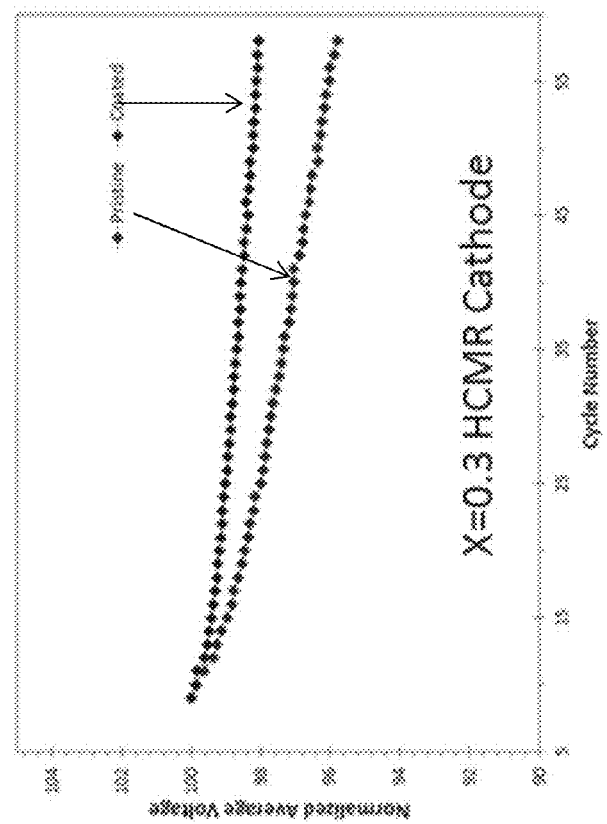
FIG. 4a is a plot of normalized average voltage of batteries formed from sample 1 using X=0.3 HCMR cathode materials with or without a target 10 mol % AlZnO coating.

Sample 11 and 12 were then used to construct coin cell batteries with lithium metal counter electrode as described above. The normalized average voltage of the batteries from samples 11 and 12 were plotted and show in FIG. 4a and FIG. 4b respectively. The X=0.3 plot in FIG. 4a shows very similar trends as demonstrated for the lower X materials discussed in example 1 above, in which the coated sample has very little drop in average voltage over cycling. The performance results associated with the X=0.5 material in FIG. 4b shows that there is still a significant voltage fade over the tested number of cycles even with the improved coating, though the coated sample seems to show more of a flattening, i.e., a reduced fade, over the cycling period.

Example 3

Improving the Uniformity of the Surface Coating

This example is directed to the optimization of the physical characteristics of the nanocoating, including uniformity and thickness.

Figure 5:
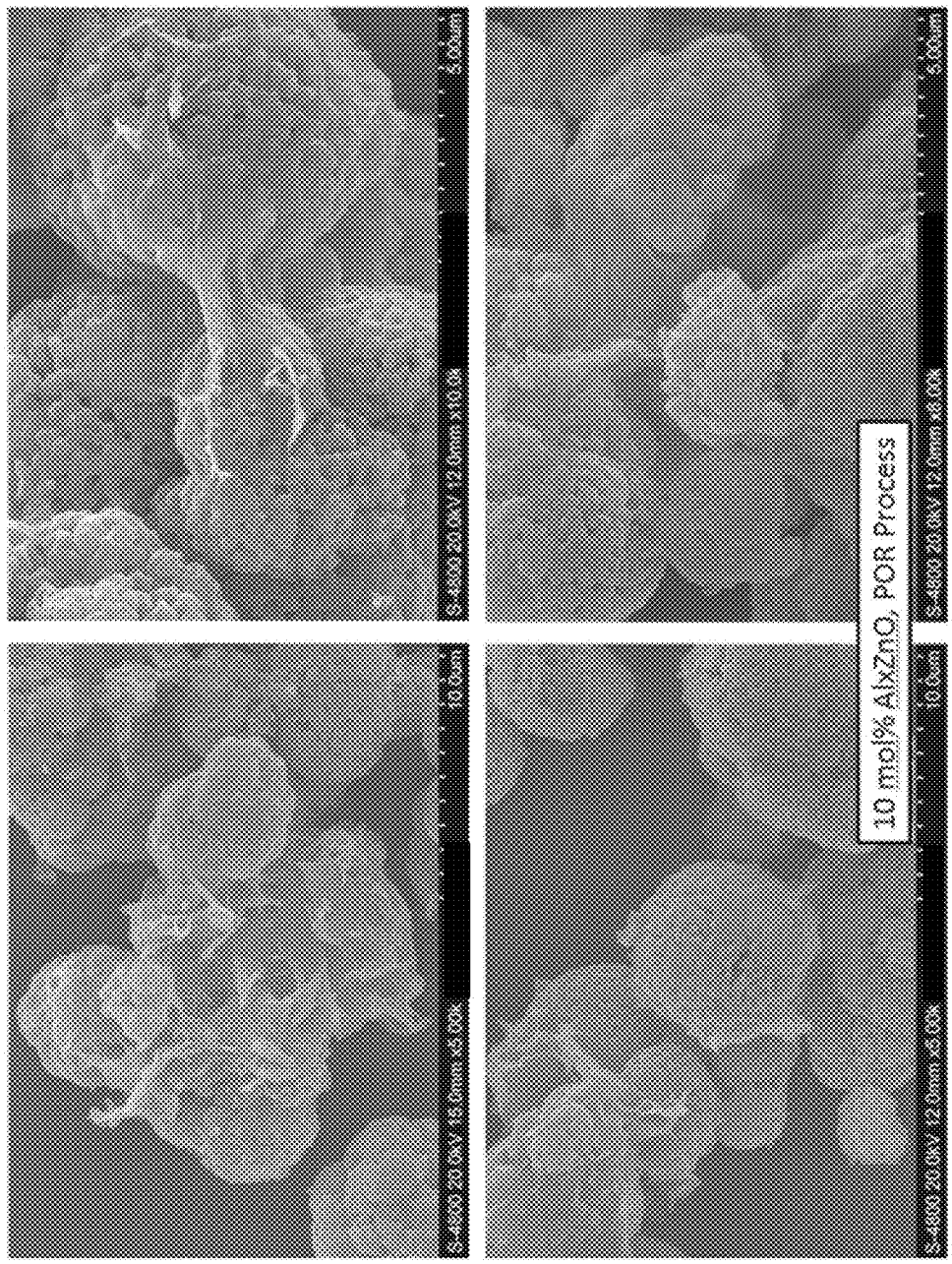
FIG. 5 shows SEM images of sample 7 synthesized with standard coating process of Example 1.
Figure 6:
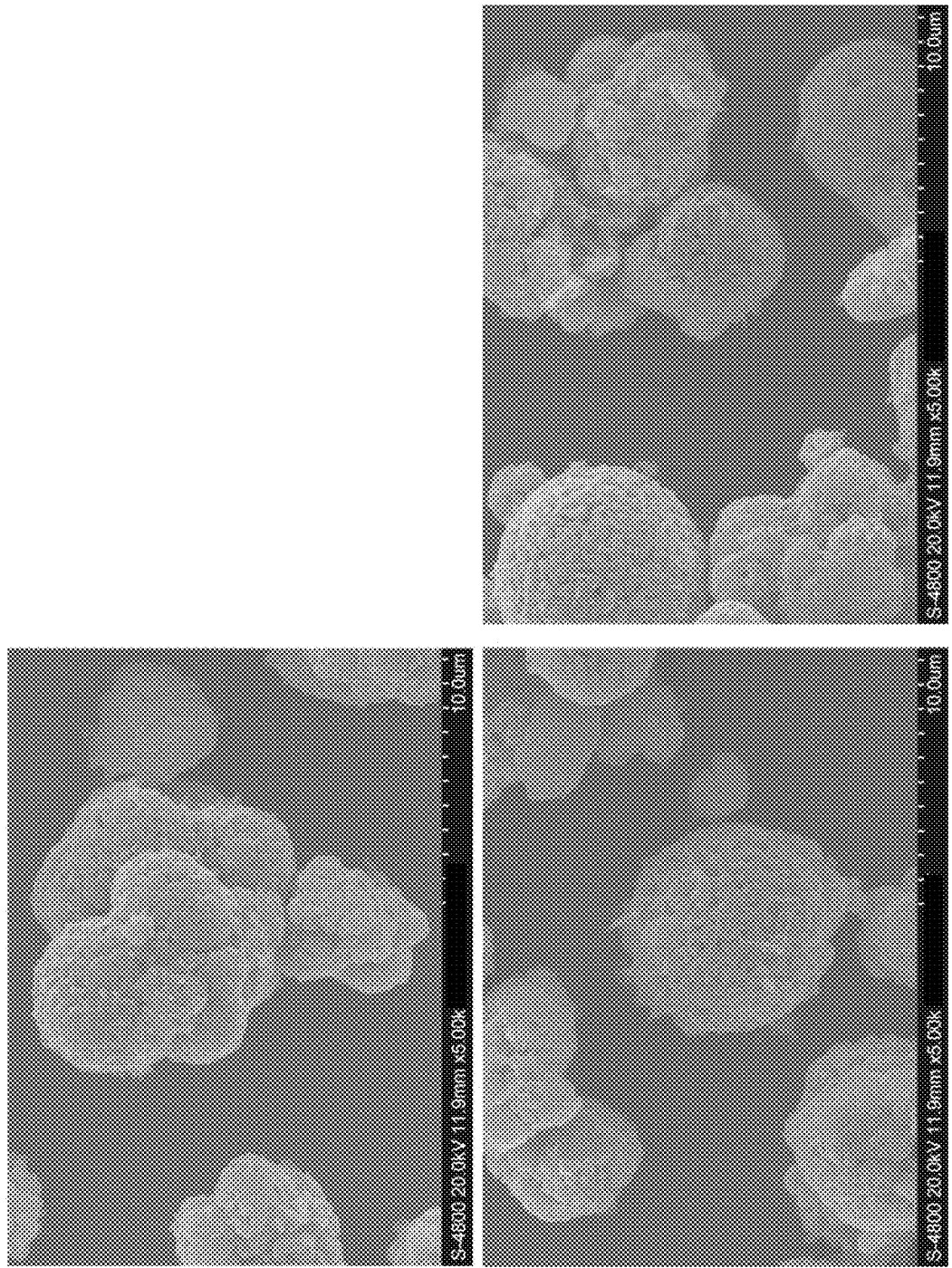
FIG. 6 shows SEM images of sample 7a synthesized with improved coating process of Example 3.

When sample 7 with a 10 mol % target AlZnO coating synthesized according to the procedure of Example 1 was analyzed by scanning electron microscopy (SEM), as shown in FIG. 5 large regions of precipitated material were observed separate from the cathode structure. Further analysis using energy dispersive spectroscopy (EDS), which can be performed in conjunction with SEM, shows that these excess precipitated materials in fact contain high contents of Al and Zn. Thus, the coating formed using the procedure of Example 1 appears to be very non-uniform. Based on these images, experiments were designed with the objective to improve the uniformity of the coating. Since precipitation of AlZnO occurs during the addition of the base solution to the reaction mixture, parameters involving the addition of the base solution were adjusted. Three factors were changed: (1) the base addition flow rate was reduced from 4 mL/min to 0.6 mL/min, (2) the DI water volume of the base solution was increased 4 fold, and (3) the concentration of $NH_4OH$ in the base solution was reduced by a factor of 10. Each of the three changes resulted in slight reduction of large AlZnO regions of the coating material apart from the LMO particles. Interestingly, a combination of all three changes afforded sample 7a with the most uniform coating consisting of tiny "fibers" covering the surface of every particle, shown in the three TEM of FIG. 6. All coating experiments used the same metal ion reaction mixture with a 10 mol % target AlZnO coating.

Additionally, the electrochemical performance of these coin cell batteries were evaluated and compared in Table 4 below. The specific capacities (C/10 charge and C/10 discharge) and IRCL listed in the table are in mAh/g. The decrease in Mn dissolution for sample 7a relative to sample 7 is consistent with a more uniform coating providing better protection of the particle surface, which is a desirable improvement of the coating process.

TABLE 4

| Sample | C/10 C | C/10 D | IRCL | Mn Dissolution Average (ppm Mn) |
|---|---|---|---|---|
| 7 | 225 | 188 | 37 | 187 |
| 7a | 225 | 185 | 40 | 147 |

Figure 7:
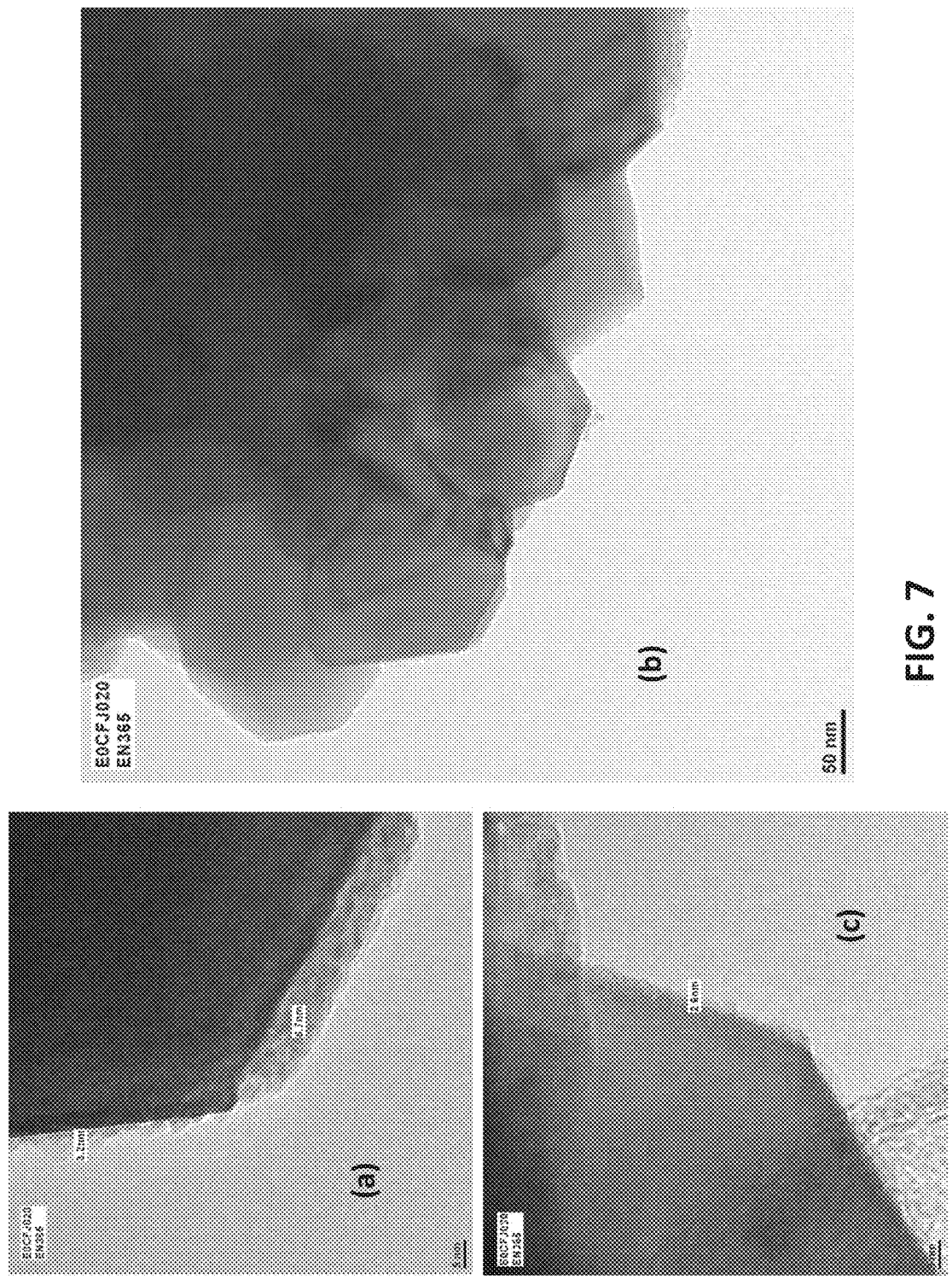
Figure 7:
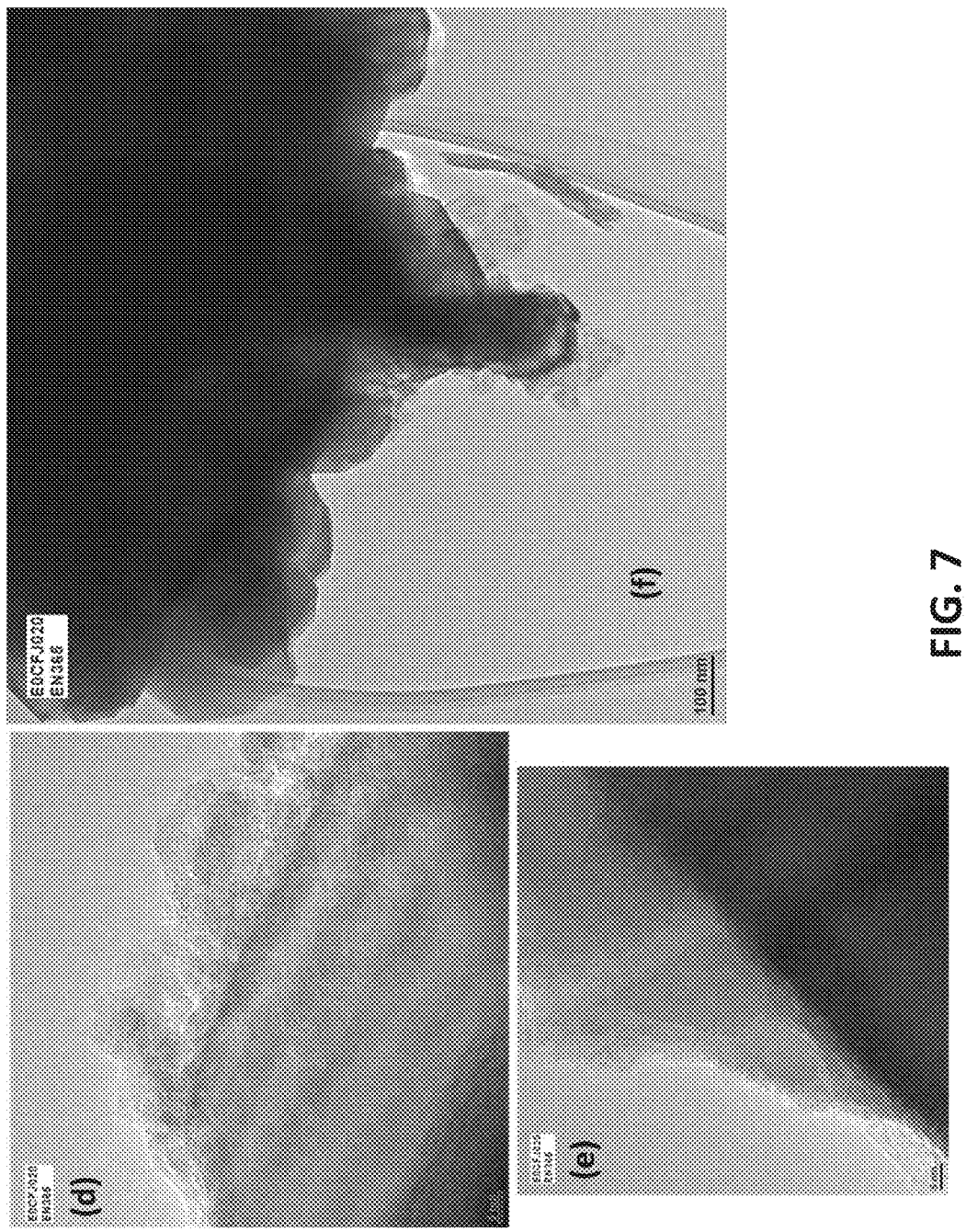
Figure 7:
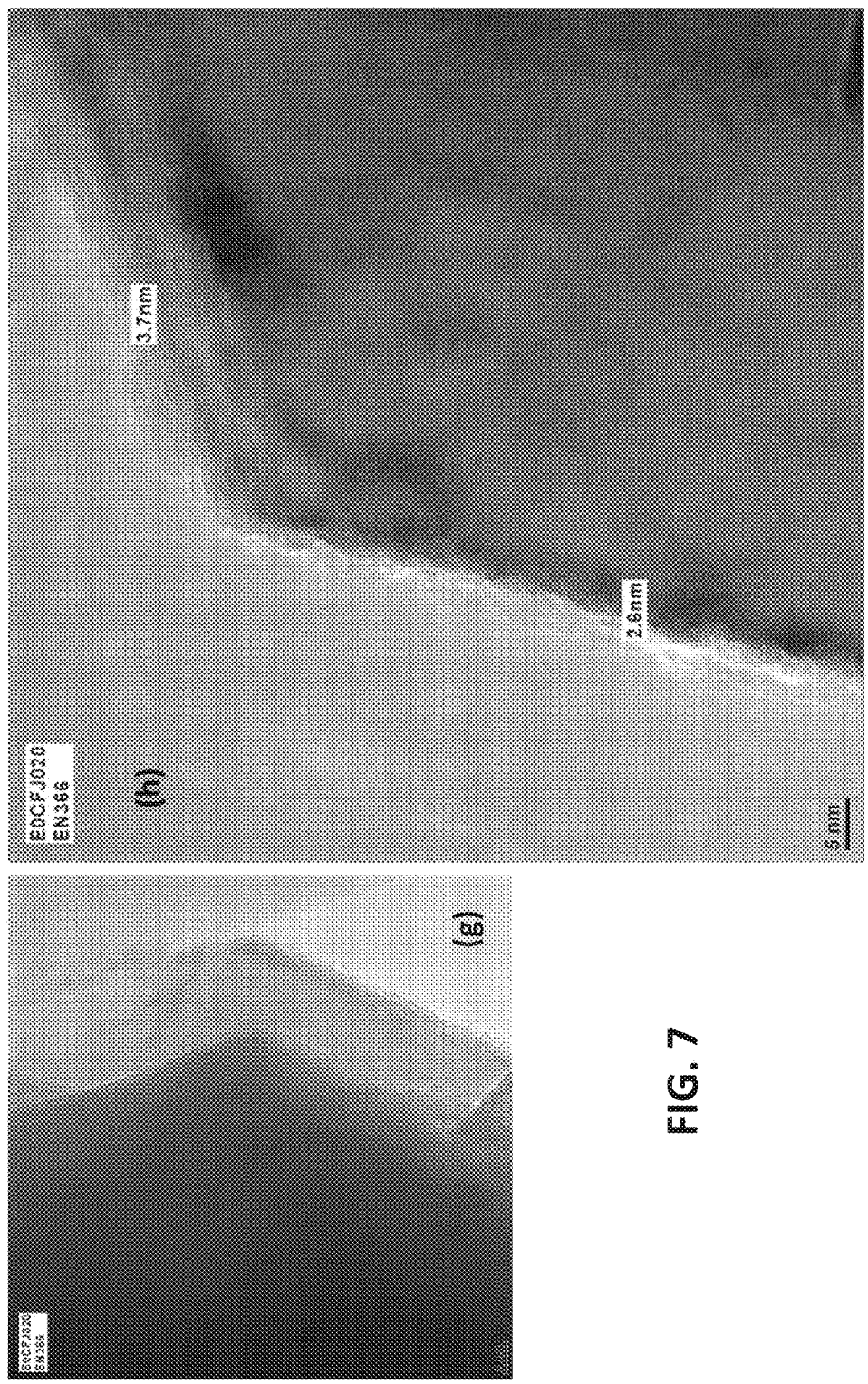

Transmission electron microscopy (TEM) analysis was performed on samples 7 and 7a to look at the surface regions that looked like normal cathode material in SEM. When looking at the edges of the material, TEM confirms that there is a nanocoating present on the sample particles. Although in some areas were non-uniform, most regions of sample 7 showed smooth coating with a thickness ranging from about 2.5 to 9 about nm with an average about 4-5 nm thick as shown in FIGS. 7(a) to 7(c). EDS confirmed that these regions are made up of Al and Zn. TEM of sample 7 plotted in FIGS. 7(d) to 7(f) revealed irregular coating in some regions where the excess AlZnO coating is believed to have precipitated in "chunks". In comparison, TEM of sample 7a is plotted in FIG. 7(g) and FIG. 7(h). The coating of sample 7a visibly appear to be similar to that of sample 7, presenting along edges at about 2.5 to about 5 nm. Although the average coating in sample 7a may be thinner it appears to be more uniform with less chunks/non-uniform regions present. The metal composition of the coated compositions was evaluated using ICP-AES. Although both samples 7 and 7a were targeting 10 mol % AlZnO coating, sample 7 appears to have 1 mol % Al and 2 mol % Zn while sample 7a appears to have 1 mol % Al and 3 mol % Zn. Thus, sample 7a had a composition closer to the target composition.

Example 4

Combination of AlZnO Coating with $AlF_3$ Coating

The results in this example demonstrate a significant improvement in performance obtained with a combination of a AlZnO coating with an $AlF_3$ overcoat.

In this experiment, 1 mol % $AlF_3$ was coated on top of 1) a sample equivalent to the target 10 mol % AlZnO coated sample 7b that was synthesized using $ZnSO_4$ source and 2) a sample equivalent to sample 7c that was synthesized using the $Zn(NO_3)_2$ source, to produce samples 13 and 14, respectively. The $AlF_3$ coating process followed the procedure outlined in U.S. Patent Application No. 2011/0111298 to Lopez et al. (the '298 Application) entitled "Coated Positive Electrode Materials for Lithium Ion Batteries", incorporated herein by reference. Briefly, ammonium fluoride was added to a blend of aluminum nitrate and the lithium metal oxide particles to precipitate aluminum fluoride. After drying the coated material, the material was heated to anneal the aluminum fluoride coating.

Figure 8:
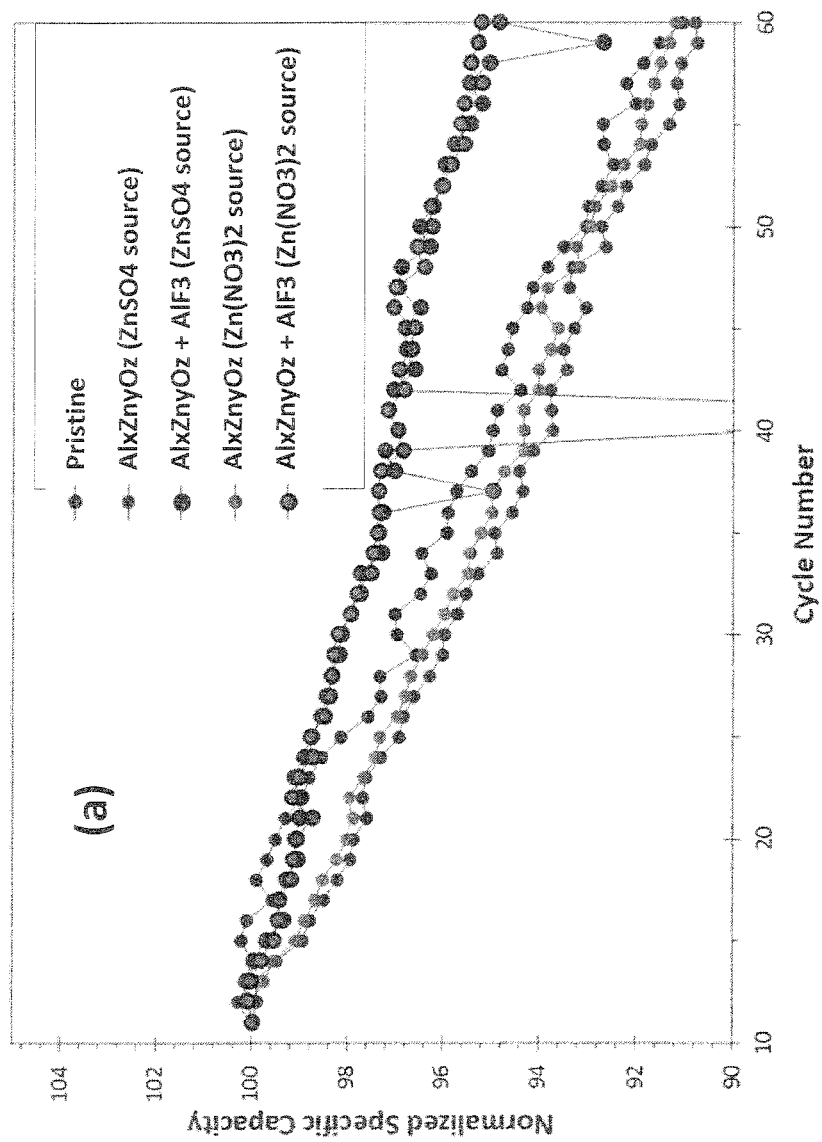
FIG. 8a shows normalized capacity over cycling of batteries formed from samples 1, 7b, 7c, 13 and 14.
FIG. 8b is a plot showing the specific capacity of batteries formed from samples 1, 7, and 13.
FIG. 8c is a plot showing the normalized specific capacity of batteries formed from samples 1, 7, and 13.
FIG. 8d is a plot showing the average voltage of batteries formed from samples 1, 7, and 13.
FIG. 8e is a plot showing the normalized average voltage of batteries formed from samples 1, 7, and 13.
Figure 8:
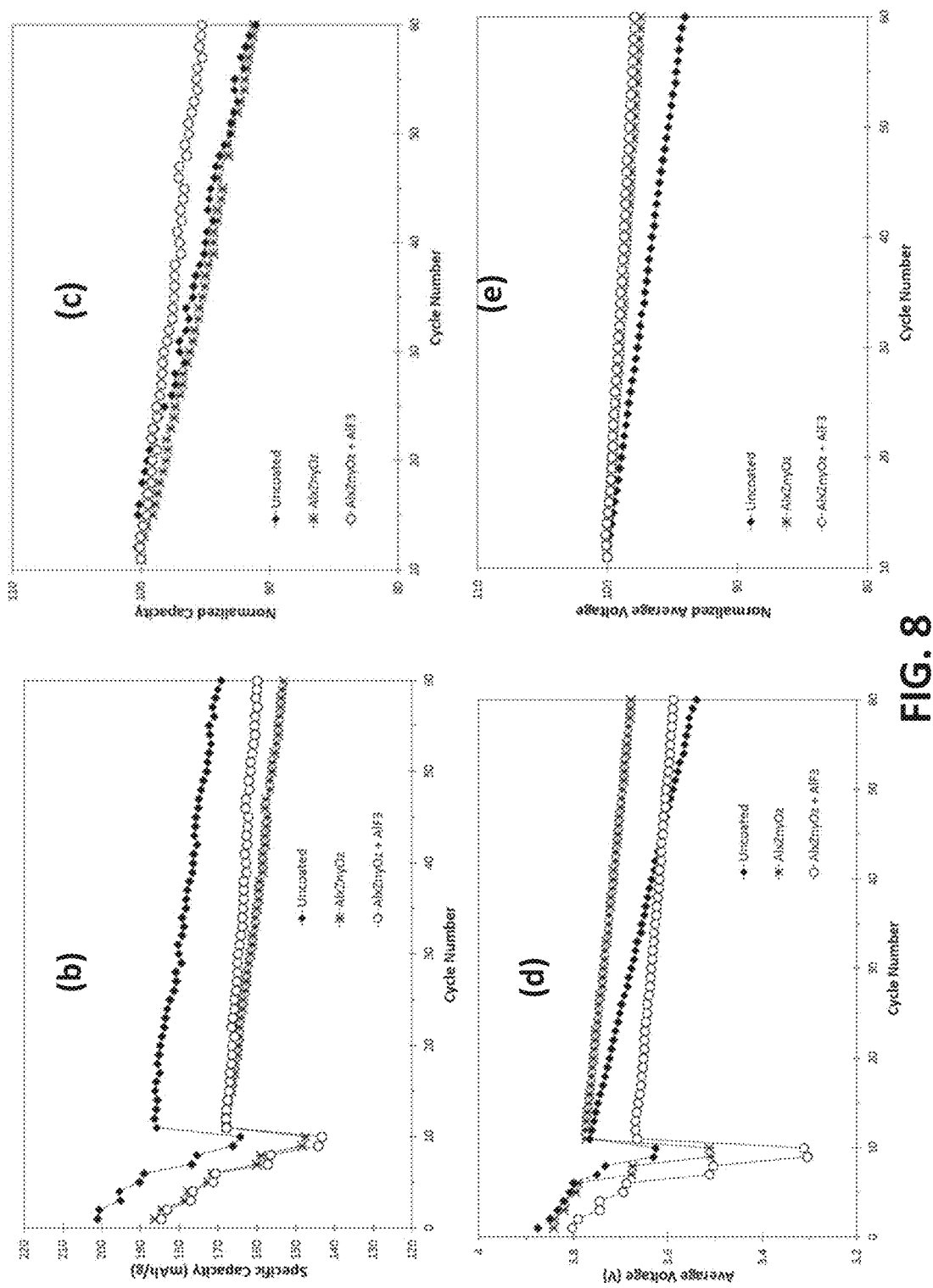

Coin cell batteries using samples 7b, 7c, 13, and 14 with lithium metal counter electrode were produced using the procedure outlined above. The normalized capacity over cycling of these coin cell batteries were measured and plotted in FIG. 8(a). Battery fondled from the uncoated sample 1 was also included as a control for comparison. As shown in FIG. 8(a), there was an additional improvement in capacity stability in samples 13 and 14. The specific capacity, normalized specific capacity, average voltage, and normalized average voltage of the samples 1, 7, and 13 were analyzed and is shown in FIGS. 8 (b) to 8(e), respectively. The electrochemical performance of these coin cell batteries were evaluated and compared in table 4 below. The specific capacity listed in the table is in mAh/g. Additionally, upon further analysis, it appears sample 7 comprises about 1 mol % Al and about 3 mol % Zn.

TABLE 4

| Coating | C/10 C | C/10 D | IRCL | C/5 | C/3 | 1 C | 2 C | Avg. V |
|---|---|---|---|---|---|---|---|---|
| 1 | 248 | 199 | 49 | 191 | 185 | 173 | 162 | 3.903 |
| 7 | 231 | 186 | 45 | 178 | 173 | 160 | 149 | 3.841 |
| 13 | 226 | 185 | 41 | 177 | 171 | 157 | 144 | 3.802 |

In summary, the nanocoating of AlZnO onto the surface of lithium rich LMO materials provides improved average voltage stability over cycling in a voltage window of 2.0-4.6V against lithium. Especially with lower X materials, the voltage decay and phase transition usually seen in uncoated materials is significantly suppressed with the coating applied. A combination of ICP, SEM, and TEM confirmed that the AlZnO has precipitated onto the surface of the LMO particles.

Example 5

Comparison of Nanocoatings

This example compares the performance of batteries with lithium metal counter electrode that have different nanocoatings for the positive electrode active material including uncoated, ZnO coated, AlZnO coated, and $AlF_3$ coated.

The same coating process described in Example 1 was performed on x=0.175 lithium rich LMO material to make AlZnO coated sample 15. The amount of aluminum and zinc precursor used was adjusted such that the final coating comprises about 1 mol % Al and 2 mol % Zn in sample 15. Similar process was used to form the ZnO coated sample 16 by using zinc precursor only without the aluminum precursor. The amount of zinc precursor used was adjusted such that the final coating comprises about 2 mol % ZnO in sample 16. The $AlF_3$ coating procedure outlined in the '298 Application was followed to produce $AlF_3$ coated sample 17. The amount of aluminum precursor used was adjusted such that the final coating comprises about 0.5 mol % $AlF_3$ in sample 17.

Samples 1 and 15-17 were then used to construct coin cell batteries with lithium metal counter electrode as described above. The electrochemical performance of these coin cells was evaluated. The cycling performance of the samples was evaluated and the result is outlined in Table 5 below showing duplicate results for each sample. The specific capacity listed in the table is in mAh/g.

TABLE 5

| Sample No. | C/10 C | C/10 D | IRCL | Avg. Voltage | C/5 | C/3 | 1 C | 2 C |
|---|---|---|---|---|---|---|---|---|
| 1 | 247 | 196 | 51 | 3.891 | 190 | 184 | 171 | 160 |
| | 246 | 195 | 51 | 3.885 | 189 | 183 | 171 | 159 |
| 16 | 240 | 191 | 49 | 3.865 | 183 | 176 | 163 | 152 |
| | 239 | 190 | 49 | 3.868 | 182 | 176 | 163 | 151 |
| 15 | 236 | 192 | 44 | 3.846 | 185 | 178 | 165 | 154 |
| | 236 | 192 | 44 | 3.846 | 185 | 178 | 166 | 154 |
| 17 | 243 | 204 | 39 | 3.889 | 197 | 191 | 179 | 172 |
| | 243 | 204 | 39 | 3.890 | 197 | 191 | 179 | 171 |

Figure 9:
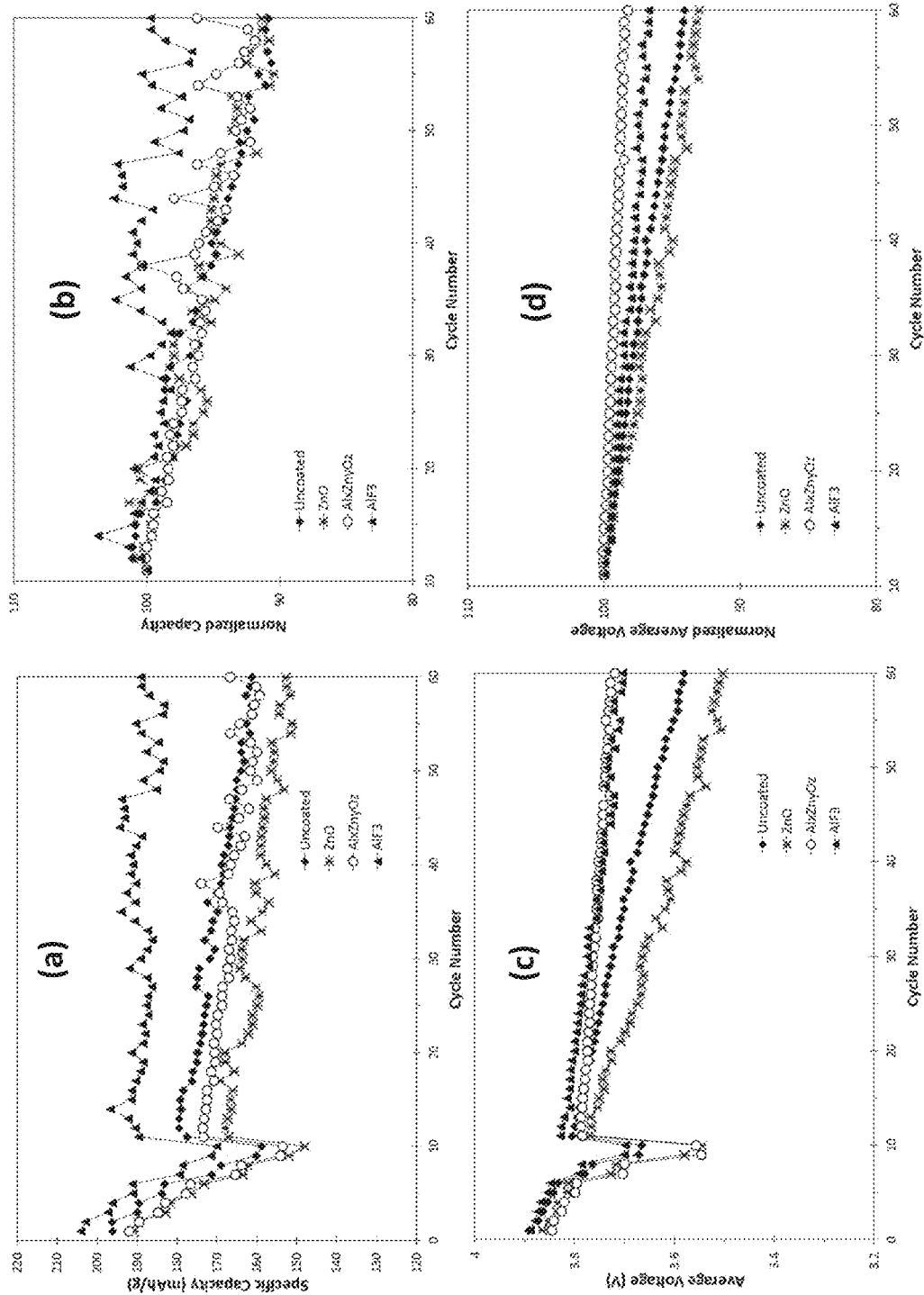
FIG. 9a is a plot showing the specific capacity of batteries formed from samples 1 and 15-17.
FIG. 9b is a plot showing the normalized specific capacity of batteries formed from samples 1 and 15-17.
FIG. 9c is a plot showing the average voltage of batteries formed from samples 1 and 15-17.
FIG. 9d is a plot showing the normalized average voltage of batteries formed from samples 1 and 15-17.

The specific capacity, normalized specific capacity, average voltage, and normalized average voltage of the samples were analyzed and is shown in FIGS. 9 (a) to 9(d), respectively. As indicated in FIGS. 9(a) to 9(d), the AlZnO coating provides improvement in normalized average voltage stability over cycling, the $AlF_3$ coating provides improvement in specific capacity, while the ZnO coating failed provide improvement in either voltage stability or capacity stability.

The AlZnO coating can also be prepared using a simultaneous addition process on x=0.175 lithium rich LMO material to make AlZnO coated sample 18. Specifically, in this process the active material was dispersed in one half the target volume. A first solution with dissolved aluminum nitrate and zinc nitrate and a second solution with the base were simultaneously slowly added to the active particle dispersion.

Sample 18 comprises about 1 mol % Al and 2 mol % Zn. Sample 18 was then used to construct coin cell battery with lithium metal counter electrode as described above. The electrochemical performance of the coin cell battery was evaluated and compared with those of samples 1, 15, and 17 in table 6 below. The specific capacity listed in the table is in mAh/g.

TABLE 6

| Sample | C/10 | C/3 | 2 C | IRCL | Capacity Retention | Voltage Retention | Mn Dissolution |
|---|---|---|---|---|---|---|---|
| 1 | 196 | 184 | 160 | 51 | 88-91% | 93-94% | >250 |
| 17 | 204 | 191 | 172 | 39 | 99-100% | 96-97% | ~180 |
| 15 | 192 | 178 | 154 | 44 | 92% | 98-99% | ~145* |
| 18 | 195 | 181 | 159 | 46 | 95% | 98% | — |

The AlZnO coated samples has shown good voltage stability, good Mn dissolution behavior and less Li removed during the cycling process compared to the AlF$_3$ coating. The simultaneous addition process in addition showed better capacity stability. TEM measurements (not shown) of the samples showed nano-coating layer.

The embodiments above are intended to be illustrative and not limiting. Additional embodiments are within the claims. In addition, although the present invention has been described with reference to particular embodiments, those skilled in the art will recognize that changes can be made in form and detail without departing from the spirit and scope of the invention. Any incorporation by reference of documents above is limited such that no subject matter is incorporated that is contrary to the explicit disclosure herein.

What is claimed is:

1. A positive electrode active material comprising a lithium metal oxide active composition coated with an amorphous aluminum zinc oxide coating composition approximately represented by the formula Al$_x$Zn$_{1-(3x/2)}$O, where x is from about 0.15 to about 0.475, wherein the lithium metal oxide active composition can be approximately represented by a formula Li$_{1+b}$Ni$_\alpha$Mn$_\beta$Co$_\gamma$A$_\delta$O$_2$, where b ranges from about 0.05 to about 0.3, α ranges from 0 to about 0.4, β range from about 0.2 to about 0.65, γ ranges from 0 to about 0.46, and δ ranges from 0 to about 0.15 with the proviso that both α and γ are not zero, and where A is Mg, Sr, Ba, Cd, Zn, Al, Ga, B, Zr, Ti, Ca, Ce, Y, Nb, Cr, Fe, V, or combinations thereof.

2. The positive electrode active material of claim 1 wherein x is from about 0.2 to about 0.45.

3. The positive electrode active material of claim 1 comprising from about 0.25 mole percent to about 10 mole percent coating composition.

4. The positive electrode active material of claim 1 comprising from about 0.5 mole percent to about 7 mole percent coating composition.

5. The positive electrode active material of claim 1 wherein b+α+β+γ+δ is approximately equal to 1.

6. The positive electrode active material of claim 1 having a specific capacity of at least about 175 mAh/g and an average voltage of at least about 3.55V discharged at a rate of C/3 from 4.6V to 2V against lithium.

7. The positive electrode active material of claim 6 having a specific capacity at the 80th cycle that is at least about 89% of the 11 cycle specific capacity when cycled at a discharge rate of C/3 from 4.6V to 2V against lithium from the 11th cycle to the 80th cycle.

8. The positive electrode active material of claim 1 further comprising an overcoat of metal halide over the aluminum zinc oxide coating.

9. The positive electrode active material of claim 8 wherein the overcoat of metal halide comprises aluminum halide and wherein the positive electrode active material has from about 1 mole percent to about 15 mole percent of the aluminum zinc oxide coating composition and from about 0.5 mole percent to about 3 mole percent of the aluminum halide overcoat.

10. A method for the synthesis of a stabilization coating comprising aluminum zinc oxide on a lithium metal oxide composition, the method comprising coating the lithium metal oxide with an aluminum zinc precursor composition and heating the precursor coated composition to form the positive electrode active material of claim 1.

11. The method of claim 10 wherein the metal ions to form the coating, a base solution or both are added gradually to a dispersion of lithium metal oxide particles to form a relatively uniform aluminum zinc oxide coating.

12. The method of claim 10 wherein the aluminum zinc precursor composition comprises a hydroxide or carbonate precipitate.

13. The method of claim 10 wherein the aluminum zinc precursor composition comprises an aluminum zinc nitrate.

14. The method of claim 10 wherein the aluminum zinc precursor composition comprises an hydroxide precipitate and wherein during precipitation of the hydroxide precursor, the base flow rate, the volume of base and the base concentration are adjusted so that no coating material is observed in SEM images separate from the particles of active material.

15. The positive electrode active material of claim 8 wherein the metal halide overcoat comprises an aluminum halide.

16. The positive electrode active material of claim 8 wherein the positive electrode active material has from about 0.5 mole percent to about 10 mole percent of the aluminum zinc oxide coating and from about 0.5 mole percent to about 3 mole percent metal halide overcoat.

17. The positive electrode active material of claim 8 having a specific capacity at the 60th cycle that is at least about 94% of the specific capacity at the 11th cycle discharged at a rate of C/3 from 4.6V to 2V against lithium from the 11th cycle to the 60th cycle.

18. The positive electrode active material of claim 1 wherein x is from about 0.25 to about 0.45.

19. A positive electrode active material comprising a lithium metal oxide active composition coated with an aluminum zinc oxide coating composition approximately represented by the formula Al$_x$Zn$_{1-(3x/2)}$O, where x is from about 0.15 to about 0.6, and from about 0.5 mole percent to about 3 mole percent of an overcoat of metal halide over the aluminum zinc oxide coating composition, wherein the lithium metal oxide active composition comprises a lithium metal oxide approximately represented by the formula Li$_{1+b}$M$_{1-b}$O$_{2-z}$F$_z$, where M is a non-lithium metal element or a combination thereof comprising Mn alone or in combination with other non-lithium metal elements and 0.01≤b≤0.3, 0≤z≤0.2.

20. The positive electrode active material of claim 19 wherein the overcoat of metal halide comprises aluminum halide and wherein the positive electrode active material comprises from about 1 mole percent to about 15 mole percent of the aluminum zinc oxide coating composition.

21. The positive electrode active material of claim 19 wherein the positive electrode active material has from about 0.5 mole percent to about 10 mole percent of the aluminum zinc oxide coating composition and from about 0.5 mole percent to about 3 mole percent the metal halide overcoat.

22. The positive electrode active material of claim 19 having a specific capacity at the 60th cycle that is at least about 94% of the specific capacity at the 11th cycle discharged at a rate of C/3 from 4.6V to 2V against lithium from the 11th cycle to the 60th cycle.

23. The positive electrode active material of claim 1 having an average voltage at the 80th cycle that is at least about 94% of the average voltage of 11th cycle when cycled at a discharge rate of C/3 from 4.6V to 2V against lithium from the 11th cycle to the 80th cycle.

* * * * *